US008996175B2

(12) United States Patent
Blumberg et al.

(10) Patent No.: US 8,996,175 B2
(45) Date of Patent: Mar. 31, 2015

(54) TRAINING AND OPERATING INDUSTRIAL ROBOTS

(71) Applicants: Bruce Blumberg, Concord, MA (US); Rodney Brooks, Cambridge, MA (US); Christopher J. Buehler, Cambridge, MA (US); Noelle Dye, Charlestown, MA (US); Gerry Ens, Boise, ID (US); Natan Linder, Cambridge, MA (US); Michael Siracusa, Chestnut Hill, MA (US); Michael Sussman, Winchester, MA (US); Matthew M. Williamson, Marblehead, MA (US)

(72) Inventors: Bruce Blumberg, Concord, MA (US); Rodney Brooks, Cambridge, MA (US); Christopher J. Buehler, Cambridge, MA (US); Noelle Dye, Charlestown, MA (US); Gerry Ens, Boise, ID (US); Natan Linder, Cambridge, MA (US); Michael Siracusa, Chestnut Hill, MA (US); Michael Sussman, Winchester, MA (US); Matthew M. Williamson, Marblehead, MA (US)

(73) Assignee: Rethink Robotics, Inc., Boston, MA (US)

( * ) Notice: Subject to any disclaimer, the term of this patent is extended or adjusted under 35 U.S.C. 154(b) by 214 days.

(21) Appl. No.: 13/621,706

(22) Filed: Sep. 17, 2012

(65) Prior Publication Data
US 2013/0345874 A1    Dec. 26, 2013

Related U.S. Application Data

(60) Provisional application No. 61/662,646, filed on Jun. 21, 2012, provisional application No. 61/676,586, filed on Jul. 27, 2012.

(51) Int. Cl.
B25J 9/02      (2006.01)
B25J 9/00      (2006.01)
(Continued)

(52) U.S. Cl.
CPC .................. *G06K 9/66* (2013.01); *B25J 9/0087* (2013.01); *B25J 13/084* (2013.01); *G05B 19/42* (2013.01); *G05B 2219/39451* (2013.01); *G05B 2219/40116* (2013.01); *G06F 17/00* (2013.01);
(Continued)

(58) Field of Classification Search
USPC .......... 700/245–247, 253, 255–259; 318/567, 318/568.1, 568.12, 568.16, 568.21; 901/1–3
See application file for complete search history.

(56) References Cited

U.S. PATENT DOCUMENTS 4,117,605 A    10/1978  Kurland et al.
4,952,772 A     8/1990  Zana
(Continued)

FOREIGN PATENT DOCUMENTS

EP             162565 A2    11/1985
EP            1537959 A2     6/2005
(Continued)

OTHER PUBLICATIONS

Communication relating to the Results of the Partial International Search for International Application No. PCT/US2013/046973 mailed Oct. 11, 2013.
(Continued)

*Primary Examiner* — Dalena Tran
(74) *Attorney, Agent, or Firm* — Morgan, Lewis & Bockius LLP

(57) ABSTRACT

Robots may manipulate objects based on sensor input about the objects and/or the environment in conjunction with data structures representing primitive tasks and, in some embodiments, objects and/or locations associated therewith. The data structures may be created by instantiating respective prototypes during training by a human trainer.

11 Claims, 7 Drawing Sheets

(51) Int. Cl.
  *B25J 13/08* (2006.01)
  *G05B 19/42* (2006.01)
  *G06F 17/00* (2006.01)
  *G06K 9/20* (2006.01)
  *G06K 9/62* (2006.01)
  *G06K 9/66* (2006.01)
  *G06N 99/00* (2010.01)

(52) U.S. Cl.
  CPC ........... *G06K 9/2081* (2013.01); *G06K 9/6255* (2013.01); *G06N 99/005* (2013.01); *Y10S 901/09* (2013.01); *Y10S 901/31* (2013.01); *Y10S 901/46* (2013.01); *Y10S 901/47* (2013.01); *Y10S 901/03* (2013.01)
  USPC ........ 700/259; 901/3; 901/9; 901/31; 901/46; 901/47

(56) References Cited

U.S. PATENT DOCUMENTS

| | | |
|---|---|---|
| 5,268,837 A | 12/1993 | Saylor |
| 5,488,689 A | 1/1996 | Yamato et al. |
| 5,652,910 A | 7/1997 | Boutaud et al. |
| 5,739,660 A | 4/1998 | Gnann |
| 5,783,834 A | 7/1998 | Shatas |
| 5,938,710 A | 8/1999 | Lanza et al. |
| 6,353,814 B1 | 3/2002 | Weng |
| 6,363,301 B1 | 3/2002 | Tackett et al. |
| 6,438,842 B1 | 8/2002 | Raami |
| 6,484,083 B1 | 11/2002 | Hayward et al. |
| 6,760,645 B2 | 7/2004 | Kaplan et al. |
| 6,826,452 B1 | 11/2004 | Holland et al. |
| 6,941,192 B2 | 9/2005 | Tang et al. |
| 7,024,276 B2 | 4/2006 | Ito |
| 7,096,090 B1 | 8/2006 | Zweig |
| 7,152,050 B2 | 12/2006 | Aoyama et al. |
| 7,181,314 B2 | 2/2007 | Zhang et al. |
| 7,209,801 B2 | 4/2007 | Anfindsen et al. |
| 7,221,983 B2* | 5/2007 | Watanabe et al. ............... 700/11 |
| 7,236,618 B1 | 6/2007 | Chui et al. |
| 7,236,854 B2 | 6/2007 | Pretlove et al. |
| 7,289,884 B1 | 10/2007 | Takahashi et al. |
| 7,328,196 B2 | 2/2008 | Peters, II |
| 7,353,081 B2 | 4/2008 | Skourup et al. |
| 7,353,082 B2 | 4/2008 | Pretlove et al. |
| 7,413,565 B2 | 8/2008 | Wang et al. |
| 7,450,538 B2 | 11/2008 | Apneseth et al. |
| 7,626,569 B2 | 12/2009 | Lanier |
| 7,643,907 B2 | 1/2010 | Fuhlbrigge et al. |
| 7,646,161 B2 | 1/2010 | Albu-Schäffer et al. |
| 7,720,572 B2 | 5/2010 | Ziegler et al. |
| 7,720,775 B2 | 5/2010 | Shimomura et al. |
| 7,826,984 B2 | 11/2010 | Sjostrand et al. |
| 7,848,565 B2 | 12/2010 | Goerick et al. |
| 7,852,355 B2 | 12/2010 | Friedrich et al. |
| 7,979,162 B2 | 7/2011 | Niemela et al. |
| 8,022,655 B2 | 9/2011 | Endresen et al. |
| 8,079,143 B2 | 12/2011 | Zhang et al. |
| 8,090,475 B2 | 1/2012 | Blanc et al. |
| 8,099,191 B2 | 1/2012 | Blanc et al. |
| 8,121,729 B2 | 2/2012 | Blanc et al. |
| 8,140,188 B2* | 3/2012 | Takemitsu et al. ............ 700/245 |
| 8,160,743 B2 | 4/2012 | Birkenbach et al. |
| 8,185,346 B2 | 5/2012 | Sjostrand et al. |
| 8,190,294 B2 | 5/2012 | Sjostrand et al. |
| 8,380,348 B2 | 2/2013 | Neki et al. |
| 8,588,972 B2 | 11/2013 | Fung |
| 8,639,644 B1 | 1/2014 | Hickman et al. |
| 8,731,276 B2 | 5/2014 | Mizutani et al. |
| 2001/0028339 A1 | 10/2001 | Tani |
| 2002/0050802 A1 | 5/2002 | Inoue et al. |
| 2002/0082498 A1 | 6/2002 | Wendt et al. |
| 2004/0172164 A1 | 9/2004 | Habibi et al. |
| 2004/0172168 A1 | 9/2004 | Watanabe et al. |
| 2005/0256611 A1 | 11/2005 | Pretlove et al. |
| 2006/0048364 A1 | 3/2006 | Zhang et al. |
| 2006/0178775 A1 | 8/2006 | Zhang et al. |
| 2007/0001638 A1 | 1/2007 | Gray et al. |
| 2007/0061041 A1 | 3/2007 | Zweig |
| 2007/0106421 A1 | 5/2007 | Kamrani et al. |
| 2007/0276538 A1 | 11/2007 | Kjellsson et al. |
| 2008/0028824 A1 | 2/2008 | Brogardh et al. |
| 2008/0065257 A1 | 3/2008 | He et al. |
| 2008/0091301 A1 | 4/2008 | Brantmark et al. |
| 2008/0134801 A1 | 6/2008 | Tseng et al. |
| 2008/0140321 A1 | 6/2008 | Blanc et al. |
| 2008/0147239 A1 | 6/2008 | Chiang et al. |
| 2008/0161829 A1 | 7/2008 | Kang |
| 2008/0197710 A1 | 8/2008 | Kreitz et al. |
| 2008/0302200 A1 | 12/2008 | Tobey |
| 2009/0132088 A1 | 5/2009 | Taitler |
| 2009/0204261 A1 | 8/2009 | Strand et al. |
| 2009/0281659 A1 | 11/2009 | Wappling et al. |
| 2009/0306825 A1 | 12/2009 | Li et al. |
| 2010/0036525 A1 | 2/2010 | Casanelles et al. |
| 2010/0145509 A1 | 6/2010 | Zhang et al. |
| 2010/0184011 A1 | 7/2010 | Comerford et al. |
| 2010/0188034 A1 | 7/2010 | Young et al. |
| 2010/0236046 A1 | 9/2010 | Lundberg et al. |
| 2010/0241248 A1 | 9/2010 | Zhang et al. |
| 2010/0312391 A1 | 12/2010 | Choi et al. |
| 2010/0312392 A1 | 12/2010 | Zimmermann |
| 2011/0003640 A9 | 1/2011 | Ehrman |
| 2011/0015787 A1 | 1/2011 | Tsusaka |
| 2011/0046783 A1 | 2/2011 | Benchikh |
| 2011/0095457 A1 | 4/2011 | Sirkett et al. |
| 2011/0154934 A1 | 6/2011 | Skourup et al. |
| 2011/0178638 A1* | 7/2011 | Tsusaka et al. ............... 700/257 |
| 2011/0264266 A1 | 10/2011 | Kock |
| 2012/0011956 A1 | 1/2012 | Lundberg |
| 2012/0053728 A1 | 3/2012 | Theodorus et al. |
| 2012/0059516 A1 | 3/2012 | Lundberg et al. |
| 2012/0072023 A1 | 3/2012 | Ota |
| 2012/0116584 A1 | 5/2012 | Kim et al. |
| 2012/0130541 A1 | 5/2012 | Szalek |
| 2013/0343640 A1 | 12/2013 | Buehler et al. |
| 2013/0345863 A1 | 12/2013 | Linder et al. |
| 2013/0345869 A1 | 12/2013 | Chen et al. |
| 2013/0345870 A1 | 12/2013 | Buehler et al. |
| 2013/0345872 A1 | 12/2013 | Brooks et al. |
| 2013/0345873 A1 | 12/2013 | Blumberg et al. |
| 2013/0345875 A1 | 12/2013 | Brooks et al. |
| 2013/0346348 A1 | 12/2013 | Buehler et al. |

FOREIGN PATENT DOCUMENTS

| | | |
|---|---|---|
| EP | 2210716 A2 | 7/2010 |
| EP | 2258521 A1 | 12/2010 |
| JP | 2008-257353 A | 10/2008 |
| JP | 2011-65652 A | 3/2011 |
| KR | 10-2011-0109413 A | 10/2011 |
| WO | WO-9802825 A2 | 1/1998 |
| WO | WO-0137060 A1 | 5/2001 |
| WO | 03/045640 A1 | 6/2003 |
| WO | 2009/018538 A2 | 2/2009 |
| WO | 2010/049101 A1 | 5/2010 |
| WO | 2010/122445 A1 | 10/2010 |
| WO | 2011/140704 A1 | 11/2011 |
| WO | WO-2011153156 A2 | 12/2011 |
| WO | WO-2012004017 A1 | 1/2012 |
| WO | WO-2012004232 A2 | 1/2012 |
| WO | WO-2012010332 A1 | 1/2012 |
| WO | 2012/020858 A1 | 2/2012 |
| WO | WO-2012027541 A1 | 3/2012 |
| WO | WO-2012031954 A1 | 3/2012 |
| WO | 2012/072023 A1 | 6/2012 |
| WO | 2013/192490 A2 | 12/2013 |
| WO | 2013/192492 A1 | 12/2013 |

(56) References Cited

FOREIGN PATENT DOCUMENTS

| WO | 2013/192500 A2 | 12/2013 |
|---|---|---|
| WO | 2013/192490 A3 | 3/2014 |
| WO | 2013/192500 A3 | 4/2014 |

OTHER PUBLICATIONS

International Application Serial No. PCT/US2013/046973, International Search Report and Written Opinion mailed Feb. 5, 2014, 22 pages.
International Application Serial No. PCT/US2013/046977, International Search Report and Written Opinion mailed Oct. 31, 2013, 23 pages.
International Application Serial No. PCT/US2013/046995, International Search Report mailed Oct. 11, 2013, 3 pages.
International Application Serial No. PCT/US2013/046996, International Search Report and Written Opinion mailed Mar. 3, 2014, 24 pages.
"Robots Will Quickly Recognize and Respond to Human Gestures, With New Algorithms", Available Online at <http://www.sciencedaily.com/releases/2012/05/120524134525.htm>, May 24, 2012, 3 pages.
Arsenic, A. M., "Developmental Learning on a Humanoid Robot", Proceedings of IEEE International Joint Conference on Neural Networks, vol. 4, Jul. 25-29, 2004, pp. 3167-3172.
Azuma, Ronald T., "A Survey of Augmented Reality", In Presence: Teleoperators and Virtual Environments, vol. 6, No. 4, Aug. 1997, pp. 355-385.
Chen et al., "Gesture-Speech Based HMI for a Rehabilitation Robot", Proceedings of the IEEE Southeastcon '96, Bringing Together Education, Science and Technology, Apr. 11-14, 1996, pp. 29-36.
Feddema et al., "Model-Based Visual Feedback Control for a Hand-Eye Coordinated Robotic System", Journal Computer, Special Issue on Sharing: High Performance at Low Cost, vol. 25, No. 8, Aug. 1992, pp. 21-31.
Kragic et al., "Real-Time Tracking Meets Online Grasp Planning", Proceedings of the 2001 IEEE International Conference on Robotics and Automation. Seoul, South Korea, May 21-26, 2001, pp. 2460-2465.
Kulyukin Vladimir, "Human-Robot Interaction through Gesture-Free Spoken Dialogue", Autonomous Robots, vol. 16, No. 3, Kluwer Academic Publisher, May 2004, pp. 239-257.
Li et al., "Interactive Learning of Visually Symmetric Objects", IEEE/RSJ International Conference of Intelligent Robots and Systems, Oct. 10-15, 2009, pp. 4751-4756.
Miura et al., "Interactive Teaching of a Mobile Robot", Proceedings of the 2005 IEEE International Conference on Robotics and Automation, Apr. 18-22, 2005, pp. 3378-3383.
Nickel et al., "Visual Recognition of Pointing Gestures for Human-Robot Interaction", Image and Vision Computing, vol. 25, No. 12, 2007, pp. 1875-1884.
Sjo et al., "Object Localization using Bearing Only visual Detection", Proceedings of the 10th International Conference on Intelligent Autonomous Systems, Jul. 2008, pp. 254-263.
Thomaz et al., "Learning about Objects with Human Teachers", Proceedings of the 4th ACM/IEEE International Conference on Human Robot Interaction, 2009, pp. 15-22.
Wang et al., "Wavelet-Based Indoor Object Recognition Through Human Interaction", Proceedings of ICAR 2003 the 11th International Conference on Advanced Robotics, Coimbra, Portugal, Jun. 30-Jul. 3, 2003, pp. 959-964.
Witus et al., "Learning to See: Research in Training a Robot Vision System", Dec. 2008, 9 pages.
Belongie et al., "Shape Matching and Object Recognition Using Shape Contexts", IEEE Transactions on Pattern Analysis and Machine Intelligence, vol. 24, No. 4, Apr. 2002, pp. 509-522.
Iyer et al., "Shape-Based Searching for Product Lifecycle Applications", Computer-Aided Design, vol. 37, No. 13, Nov. 2005, pp. 1435-1446.

\* cited by examiner

TRAINING AND OPERATING INDUSTRIAL ROBOTS

CROSS-REFERENCE TO RELATED APPLICATIONS

The present invention claims priority to and the benefit of U.S. Provisional Applications No. 61/662,646, filed on Jun. 21, 2012, and No. 61/676,586, filed on Jul. 27, 2012, the entire disclosures of which are hereby incorporated herein by reference. Reference is also made to U.S. patent application Ser. Nos. 13/621,517, 13/621,519, and 13/621,561, filed on even date herewith, the entire disclosures of which are likewise incorporated herein by reference.

FIELD OF THE INVENTION

The present invention relates, generally, to robot operation and training. More specifically, various embodiments relate to the acquisition, organization, and use of task-related information by industrial robots to facilitate performance of tasks in an autonomous manner.

BACKGROUND OF THE INVENTION

Industrial robots perform a variety of tasks involving the movement and manipulation of physical objects. A typical industrial robot may, for example, have one or more arms, equipped with grippers, that allow the robot to pick up objects at a particular location, transport them to a destination location, and put them down in accordance with particular coordinates, thereby, for example, stacking them or placing them into cardboard boxes present at the destination location.

Controllers for existing industrial robots are typically programmed in languages that specify exact positions and trajectories for the robot arm(s). During execution of a programmed task, the robot arm moves a reference coordinate associated with its most distal link to an exactly specified new position, following an exactly specified trajectory. The success of existing industrial robots is due to their operation in constrained environments, which allows the person programming the robot—who is usually involved in the process of structuring the robot's workspace—to predict, with high confidence, which objects will be present in the workspace at all times, and where they will be located. As a result, moving the reference point on the robot arm to particular coordinates, via particular trajectories, and then opening or closing the gripper of the robot (or applying or releasing a suction gripper), lead to real-world actions that achieve the task desired of the robot.

A six-dimensional vector can be used to uniquely specify the reference point in three-dimensional space, along with the orientation of the most distal link. Thus, if the robot arm itself has six or fewer degrees of freedom, that vector uniquely determines the settings for all the joints of the robot. If the robot arm has more than six degrees of freedom, further specification of the desired pose of the arm is required to remove any ambiguity.

Recent programming systems for industrial robots have input layers that circumvent exposing the programmer to the six-dimensional vectors, with varying degrees of success. In one approach, the end points of the trajectories are set by physically moving the arm to a desired pose and position and then causing the robot to record that position. Various methods for moving the arm are used in practice. The most common method utilizes an external teaching pendant, i.e., a handheld control terminal, which is plugged into the robot controller only during the teaching phase. The pendant usually includes an LCD screen, a joystick or similar steering device, one or more buttons, and sometimes a full keyboard, which collectively allow the user to control and move the robot. Another technique involves equipping the most distal link of the robot arm with a load cell, and having the user switch the arm into a mode in which it responds to forces applied to the load cell. In this approach, the user guides the robot to a desired position by hand, possibly adjusts with the teaching pendant, and then gives a command to record the position. The command may be given, for example, via a button on the pendant or via speech.

Regardless of the input method used, conventional industrial robots are programmed for vectorized movement in a coordinate system relative to the robot. While some programming systems allow for inputs from external sensors to identify external locations, these, too, are translated into the coordinate system of the robot in order for the robot to move its reference point to the desired location. The translation relies on knowledge of the location and orientation of the robot relative to the external sensor; typical positional-accuracy requirements for industrial robots are in the sub-millimeter range. Consequently, if either the robot or the external sensor is moved, even if only a small distance, relative to the objects in the world, the robot will move its reference point to the wrong place in the world and, thus, fail at its task.

Further, while existing robots may use external-sensor input to detect, e.g., objects to be manipulated or equipment such as boxes or conveyor belts, such input is merely used as a gating signal for the next task. The robot's interaction with the external objects itself must be carefully programmed in terms of coordinates and trajectories, and only if the world is ordered as expected by the programmer will the robot carry out its task successfully, i.e., without collisions or misplacements. For example, in order to cause a robot to place objects in a cardboard box, e.g., in a three-by-four grid, the programmer has to specify the twelve sets of coordinates corresponding to the locations in the box where objects are to be placed. Further, to ensure that neither the robot itself nor the grasped objects will collide with the side of the box, the programmer has to specify the order in which the twelve spots are to be filled, as well as the approach directions and trajectories (which might be different for objects placed against the boundary of the box as opposed to objects placed at the center). Of course, the robot will only be able to pack objects within a narrow size range. If an object is larger, or differently shaped, than the programmer assumed, the process will be unsuccessful because, once again, the robot's actions have been so highly constrained.

Similarly, when programming a robot to pick up objects from a conveyor belt, the programmer relies on a controlled, predictable operation of the conveyor belt. Typically, an external sensor, such as a break-beam sensor attached to the conveyor, allows the robot to detect objects on the conveyor. Any time the beam is broken, an object of the desired type moving along with the conveyor is assumed to be the cause of the break. The speed of the conveyor is implicitly coded into the robot program in the form of a coordinate for a pick-up location and a time delay measured from the time of the break. An explicit velocity vector may also be included, allowing the robot gripper to move at the same velocity as the object on the conveyor belt when the gripper is activated. As long as the assumptions about the conveyor position and velocity are correct, these specifications guarantee that the robot will pick up the desired objects from the moving conveyor; otherwise, because the robot possesses no task-level knowledge, it will fail.

Robot-control programs usually include control logic that deals with error conditions. Due to the coordinate-level specificity that generally governs the robot's behavior, the response options in case of an error are limited. For example, the robot may simply stop operating, and perhaps issue an error alarm, when an essential assumption underlying a particular programmed task is violated, or the world deviates otherwise from its expected state.

Accordingly, there is a need for robots that respond more flexibly to their surroundings and tolerate greater deviations from default assumptions, and which, preferably, may be used and configured for execution of complex tasks based on intuitive interactions.

SUMMARY OF THE INVENTION

The present invention relates to robots capable of performing various tasks including the manipulation and movement of physical objects, as well as to methods of programming and/or training such robots. Execution of the tasks is, generally, based on the robot's perception of its environment. Accordingly, in various embodiments, the robot is equipped with one or more cameras or other sensors that enable it to detect, identify, and localize objects to be manipulated, as well as particular pieces of machinery or equipment that are ancillary to its tasks (such as, e.g., conveyor belts or storage boxes). In general, the detection and identification of such objects triggers performance of one or more tasks associated with them, and continuing visual or other sensory input thereafter informs the mode and manner of execution. For example, having identified an object to be moved to a particular destination, the robot may direct one of its cameras to monitor its path so as to detect any obstacles and avoid colliding with them. The tasks may be stored in the robot as supplied or defined, or refined, by training.

In accordance with various aspects and embodiments of the invention, the robot is generally not (or not exclusively) programmed in the usual sense—i.e., by means of hard-coded instructions. Instead, it may be trained via direct interaction with a human. The human trainer may, for example, guide the robot and/or any of its appendages to a desired location, and show it how to manipulate an object by adjusting an appendage relative to the object, pushing buttons to open or close the appendage, etc. Such mechanical input may be supplemented with user interaction via a screen and ordinary input devices such as, e.g., keyboard, mouse, or touch pad to specify or refine an already-stored task. For example, the robot may display an image corresponding to its field of view on a screen and allow the user to show it objects by pointing at them on the screen (e.g., using a mouse or touch-sensitive screen). Once an object to be manipulated has been identified, the robot may display a list of possible manipulations, each corresponding to a pre-stored task, from which the user may select by clicking on a desired one. In addition, certain parameters associated with a task, such as a maximum speed associated with a robot motion, may be entered, e.g., in text format via the keyboard. Importantly, in many embodiments, interaction between the robot and its trainer is structured in a way that requires little or no specialized technical expertise from the trainer.

As a result of the robot's training, data structures representing the various tasks may be created and stored in memory associated with the robot's control system. In general, these representations do not, or at least do not completely, define the tasks in terms of spatial coordinates and trajectories of the robot appendage(s), but instead correspond to generic, spatially unspecified motions relative to objects in the environment. Thus, during execution of a particular task, the robot supplements the representation of that task with information about the robot's surroundings, and the objects and equipment therein, as it perceives them at that time. Taking the robot's environment into account in this manner obviates the need to make precise assumptions about the environment at the training stage, and inherently provides the robot with more flexibility to carry out its tasks, automatically handle errors, and take advantage of changed circumstances. Further, centering the training on individual tasks triggered by respective sets of circumstances allows the trainer to teach these tasks in any order, regardless of the sequential order in which tasks that make up a more complex procedure typically need to be executed. Conversely, the robot may select or propose a task based on its perception of its environment; detection of a particular type of object, for example, may cause the robot to review the tasks associated with that object, and further narrow these possibilities based on additional perceived objects—e.g., detection of a box object in combination with an empty conveyor belt may trigger tentative selection of an already-stored task involving picking up and moving boxes onto the conveyor belt.

In various embodiments, this flexibility in robot training and in the robot's performance of its tasks is facilitated by a two-tiered data structure. The first tier comprises hard-coded prototypes of primitive or complex tasks (complex tasks generally being series of primitive or elementary tasks such as "pick up," "move", or "put down"), as well as of objects, locations, equipment, and/or other generic categories relevant to the tasks. Each prototype specifies what information is required to fully define a particular member of the respective category or class; typically, a prototype takes the form of a list of "fields" or "slots" corresponding to various attributes of the class and having associated parameter values. The second tier includes instances of the prototypes, which are created during the training phase by populating at least some of the fields based on, generally, a combination of default assumptions, the robot's perception of its environment at the time of training, and direct input from the trainer. Slots that remain open during this stage may be filled at the time of execution based on the robot's perception. Instances typically do not, or not completely, define tasks or locations in terms of absolute coordinates, but in reference to objects in and parameters of the environment. Instances of some prototypes may reference instances of other prototypes. For example, an instance of a task may specify a class of objects to be manipulated or a type of equipment to be used for that purpose, where the object class and/or equipment are, themselves, defined in class- or equipment-specific instances.

The two-tiered representation of tasks and other categories—in generic prototypes and specific instances of these prototypes—facilitates tuning the degree to which the robot is controlled via hard-coded instructions along a continuum of specificities, leaving any missing specifics to be filled in during training and/or execution. Further, it allows defining robot tasks at varying levels of complexity, ranging from primitive tasks to complex tasks that involve many movements and manipulations. For some applications, e.g., where the robot is stationary, the anticipated states of the environment fall within narrow limits, or a particular order of executing subtasks is required, constraints may be imposed by programming complex tasks directly into the robot and reducing the training phase to minimal customizations. For other applications, maximum flexibility at the training and/or execution stage may be desirable, calling for more abstract definitions of primitive prototypes that, once instantiated, serve as building blocks for more complex tasks.

Accordingly, in a first aspect, the present invention provides a robot trainable, via interactions with a human trainer, to manipulate objects. In various embodiments, the robot includes one or more appendages for manipulating objects and a controller for operating the appendage(s). These embodiments further include computer memory for storing a library of prototypes at least one of which defines a type of task to be performed by the appendage on an object, a perception system for receiving physical input (e.g., mechanical or visual input) from the human trainer related to the task, a training module for creating an instance of the task prototype by specifying at least one attribute thereof based on the physical input, and a task-execution module for executing the instance via commands to the controller, thereby causing the appendage to perform the task. The task generally involves movement of the appendage and/or manipulation of the object. Herein, the term "manipulation" refers to a robot motion that involves physical contact between the robot (e.g., a gripper or other end-effector) and the object, and connotes any mechanical operation on the object, e.g., grasping, moving, lifting, striking, etc. Manipulation may or may not involve structural change to the object. The instance may define the task in terms of generic, spatially unspecified motions of the appendage, e.g., in terms of motions defined without specifying spatial trajectory, or in terms of motions of the appendage relative to the object and/or its environment.

The perception system may include one or more pressable buttons, knobs, touch-sensitive pads, touch-sensitive cuffs, and/or cameras (or other visual sensors), and may be configured to receive physical information about the object or an environment thereof. The robot controller may be configured to operate in zero-force gravity-compensated mode in response to a physical input (e.g., touching of the cuff). In some embodiments, the robot further includes one or more output devices responsive to the user interface system for providing task-related feedback to the trainer. Such feedback may, for example, include an indication of robot status, a request for further input, or an error alert, and may take the form of graphics overlaid onto a robot camera view. The library of prototypes may include prototypes defining an object class, a type of equipment, or a location. In some embodiments, the training module creates an instance of the object class based on visual input about a member of the class; the object subject to the manipulation may be a member of a class of objects referenced by the instance.

In another aspect, the invention is directed to a method of robot learning based on interactions with a human trainer. In various embodiments, the method involves receiving physical input from the trainer regarding a task to be performed by the robot, and, in response to and based at least in part on the input, selecting a prototype associated with the task from a library of stored prototypes. An instance of the prototype is created and stored in a database. The instance specifies a robot movement or a robot manipulation to be performed on the object, and may define the task in generic, spatially unspecified terms. The method may further include specifying one or more attribute of the instance based on the physical input.

The physical input may be or include mechanical input and/or visual input. For example, in some embodiments, receiving physical input involves sensing physical contact with the trainer and/or an object; acquiring one or more images of the trainer, the object, or the environment; and/or tracking a position of the robot appendage as the appendage is being moved by the trainer. In response to and based at least in part on the input, a prototype defining an object class may be selected and instantiated so as to create a representation of the object in memory. The method may further include providing feedback to the trainer, e.g., by indicating a status of the robot, requesting additional input from the trainer, and/or alerting the trainer to an error. Feedback may be provided in the form of graphics overlaid onto a robot camera view or in the form of haptic feedback.

In a third aspect, a robot for manipulating objects within an environment based on physical perception thereof is provided. In various embodiments, the robot includes one or more appendages for manipulating an object and a controller for operating the appendage(s), a perception system for receiving physical information about the object and/or the environment from one or more sensors, an instance database including a plurality of instances at least some of which specify tasks to be performed by the appendage on the object, and a task-execution module for selecting one or more of the instances based on the received information. Optionally, an attribute of the selected instance may be specified based on the physical information. The task-execution module executes the selected instance(s) via commands to the controller. Again, the instances may define the task in generic, spatially unspecified terms, such as in terms of motions of the appendage relative to the environment or the object, and/or without specifying spatial trajectories.

The instance database may further include one or more instance defining one or more object classes, types of equipment, or locations. The task-defining instance(s) may reference any of the other instances (i.e., an object class, equipment, or location instance). In one embodiment, the task-defining instance references an object class, and the task execution module is configured to cause the robot appendage, upon detection by the perception system of an object belonging to the object class, to perform the task on the detected object. The perception system may include one or more cameras, e.g., in conjunction with a computer vision system. Further, the perception system may include mechanical input devices such as one or more pressable buttons, knobs, touch-sensitive pads, or touch-sensitive cuffs.

In a further aspect, a robot-implemented method of manipulating an object within an environment is provided. The method involves receiving sensor input about the object and/or the environment (e.g., acquiring one or more images thereof, or detecting physical contact with an object in the environment), and, based on the sensor input and a database of instances specifying tasks to be performed by the robot on the object, selecting at least one of the instances, optionally specifying one or more attribute(s) of the selected instance(s), and executing the selected instance(s) so as to cause a robot appendage to manipulate the object in accordance therewith. Executing the instance(s) may involve instantiating a behavior associated with the instance. The behavior may include a plurality of threads having sets of conditions associated therewith, and executing the instance may involve monitoring the threads for satisfaction of the conditions, which may trigger transitions between threads. Task execution may also involve running one or more behaviors that prevent collisions of the robot with itself or an object in the environment. The instance database may include, in addition to task-defining instances, instances of various object classes, each object class being associated with at least one of the task instances. Based on the input, the object class to which the object belongs may be identified, and the executing step may then be performed in accordance with a task instance associated with the object class.

In still another aspect, the invention relates to a robot for manipulating objects within an environment based on physical perception thereof. In various embodiments, the robot includes one or more appendages for manipulating an object and a controller for operating the appendage(s); a perception system for receiving physical information about the object and the environment from at least one sensor (e.g., a camera and computer vision system and/or one or more touch-sensitive detectors); an instance database with a plurality of instances at least some of which specify tasks to be performed by the appendage on the object, where each task specifies an object and an action to be performed thereon and is defined in generic, spatially unspecified terms; and a task-execution module, responsive to the perception system, for executing the tasks via commands to the controller.

In some embodiments, the task-execution module generates, on the fly and based on the physical information, a trajectory corresponding to the task in a coordinate system associated with the robot. In other embodiments, the task-execution module continuously monitors the object and, based thereon, causes the robot appendage to move toward the object without computing trajectory coordinates. Movement toward the object may continue as long as a pre-condition associated therewith is satisfied, as determined by the task execution module based on the monitored object. The pre-condition may, for example, be or include the absence of physical contact between the appendage and the object.

In another aspect, a method for manipulating objects within an environment thereof includes receiving sensor input about the object and/or the environment (e.g., by acquiring images of the object). In various embodiments, based on (i) the sensor input and (ii) an instance database comprising a plurality of instances specifying tasks (to be performed by the robot on the object) in generic, spatially unspecified terms, at least one of the task instances is executed so as to cause a robot appendage to manipulate the object in accordance therewith. Executing the task instance may involve generating an on-the-fly trajectory in a coordinate system associated with the robot. Alternatively, it may involve continuously monitoring the object and, based thereon, causing the robot appendage to move toward the object without computing trajectory coordinates. For example, task execution may include determining whether a pre-condition associated with the task (e.g., absence of physical contact between the appendage and the object) is satisfied and, if so, continuing movement toward the object.

In some embodiments, executing the task instance includes instantiating a behavior associated with the instance. The behavior may include a plurality of threads with associated sets of conditions; the threads may be monitored for satisfaction of the conditions, which may trigger transitions between threads. The method may, further, involve running a behavior preventing collisions of the robot with itself or an object in the environment.

BRIEF DESCRIPTION OF THE DRAWINGS

The foregoing will be more readily understood from the following detailed description of the invention, in particular, when taken in conjunction with the drawings, in which.

DETAILED DESCRIPTION

1. System Overview

Figure 1:
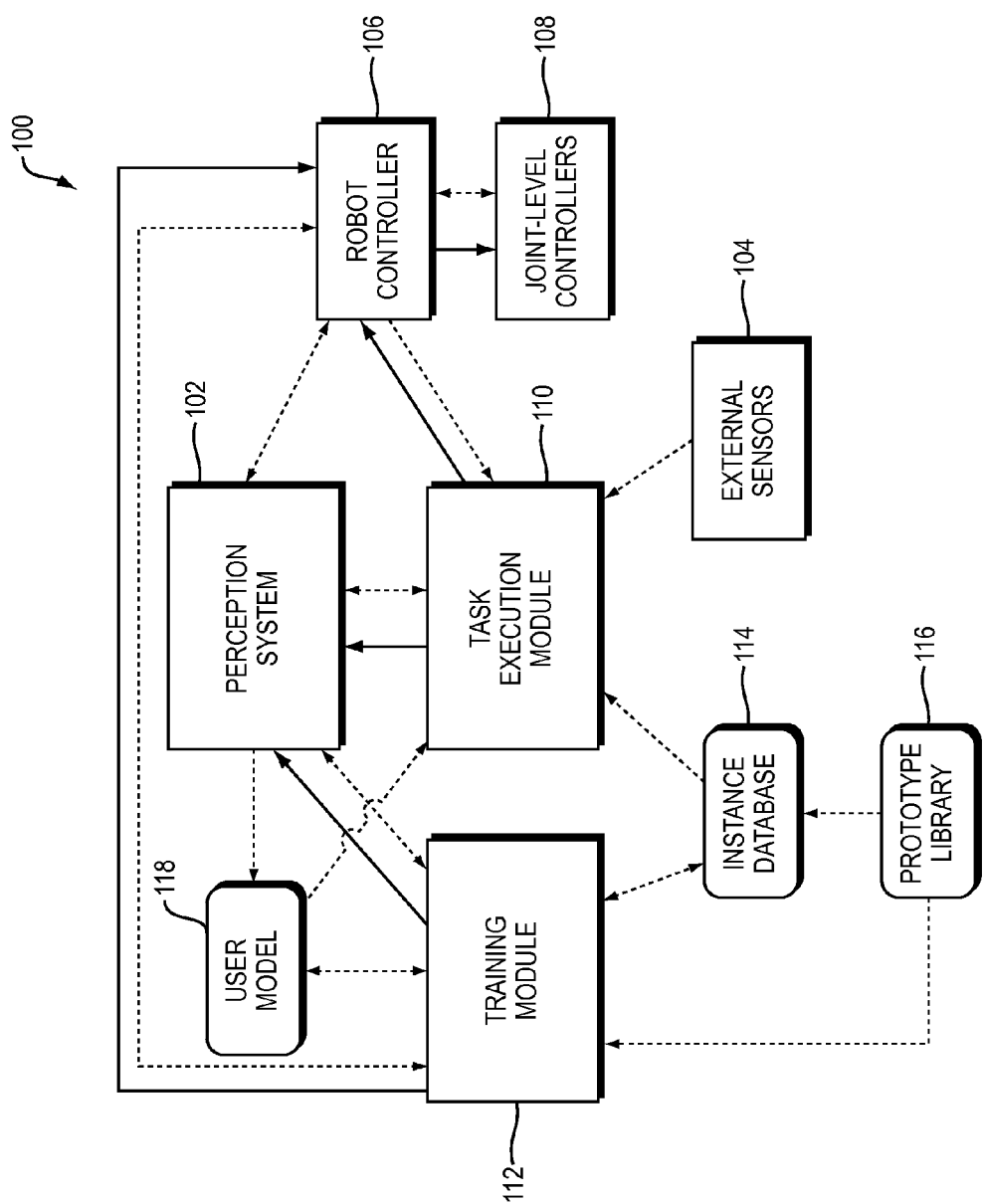
FIG. 1 is a block diagram illustrating a system in accordance with various embodiments.

FIG. 1 illustrates the architecture of an exemplary control system 100 for training and operating robots in accordance with various embodiments hereof. The system includes several functional components (depicted as boxes with sharp corners), implemented in hardware and/or software, as well as a number of data structures (depicted as boxes with rounded corners). The functional components generally operate in parallel and communicate with each other and with the data structures (although various functional components that are implemented in software, while depicted as self-operative modules, are ultimately executed by a processor). FIG. 1 indicates communication paths with arrows. Dashed arrows indicate information flowing in the direction of the arrow; double-headed dashed arrows indicate bi-directional information flow; and solid arrows indicate that control commands are passed in the direction of the arrow.

To enable the robot to act upon its environment, the system 100 includes a perception system (or subsystem) 102, which typically includes one or more cameras for acquiring images of the environment, as well as a suitably programmed computational facility (e.g., a software module whose instructions are executed by a general-purpose processor) for processing and interpreting the images. The cameras typically operate in the visible spectrum, but some embodiments may utilize, alternatively or additionally, infrared cameras or cameras detecting other frequency ranges within the electromagnetic spectrum. In some embodiments, one or more stereo cameras or, more generally, a depth-sensing camera system (e.g., a KINECT camera) may be used. Collectively, the cameras (or other optical sensors) and the image-processing facility form a computer vision system. The perception system 102 may also include additional sensors, such as, for example, temperature sensors, pressure sensors, humidity sensors, touch pads, haptic sensors, position and orientation sensors (e.g., GPS or gyromagnetic sensors), velocity sensors and/or accelerometers, electrical sensors, and/or magnetic sensors, as are well-known in the art. Further, in addition to sensors integrated into the system 100 itself, the system 100 may include an interface 104 for receiving signals from external and third-party sensors and sensor systems. This interface 104 facilitates supplementing the robot's internal sensing capabilities with capabilities available in the environment in which the robot is deployed.

The system 100 further includes a robot controller 106 that monitors and alters robot positions, kinematics, dynamics, and forces, and, in communication with and accepting commands from the robot controller 106, one or more joint-level controllers 108 that drive individual motors and actuators to move the robot and/or its moving parts (which generally includes the appendage(s) and end-effector(s), and may further include, e.g., the camera(s) or other sensors) as directed by the robot controller 106. The robot controller 106 may exchange information with the perception system 102. For example, when the controller 106 causes a robot appendage or end-effector to move, a camera integrated into the appendage may monitor the motion to provide feedback to the controller 106. Conversely, information provided by the controller 106 to the perception system 102 may aid the execution of visual tasks; if the robot camera is, for example, tasked with tracking an object, information from the controller 106 about the location of the camera relative to the expected object location may enable the camera to predict the approximate size of the object in the image, allowing it to limit the size of the region within its field of view that it needs to search for the object. By continuously exchanging information, the controller 106 and perception system 102 may assist each other in tracking an object both visually and mechanically, e.g., in order to pick it up from a conveyor belt.

At the heart of the system 100 is the task-execution module 110, which manages the robot's behavior as the robot does useful work, and the training module 112, which allows a user to train the robot, and also provides cues to people about the intentions and state of the robot during its normal operation. Interactions between the robot and the user generally take place via components of the perception system 102 and/or via traditional user interface devices such as, e.g., keyboard, mouse, or touch screen. Accordingly, the task-execution and training modules 110, 112 are configured to receive information from, and send control commands to, the perception system 102. Furthermore, both modules 110, 112 exchange information with and provide commands to the robot controller 106 to direct the controller's performance of subtasks. The task-execution module 110 and the training module 112 generally do not receive control commands from each other or from any other component. Rather, they are the source of control for the entire system 100. For example, in response to information received from the perception system 102 (e.g., the detection of a new object), the training module 112 or task-execution module 110 may initiate a new action or primitive task via commands to the controller 106. By contrast, during execution of the primitive task, the controller 106 may be guided directly by the perception system 102, without the need for the information to pass through one of the modules 110, 112 first.

The task-execution module 110 and the training module 112 are tied together by, and interact through, a set of shared representations; the instructions defining the two modules enable user manipulation of these shared representations, which are created during robot training by instantiating prototypes of tasks, objects, and/or places (and, possibly, other categories), resulting in a database of instances 114. The prototypes themselves are typically organized in a prototype library 116. In some embodiments, the task-execution module 110 and the training module 112 are integrated into one module that provides both training and task-execution functionality; this avoids duplication of functions that are used by both modules.

The system 100 may also include one or more user models 118 that include data relevant to ensuring that the task-execution and training modules 110, 112 interact with a person appropriately (which may include, for example, identifying whether a particular person is an authorized user and imposing safety constraints on movement when any person enters the robot's operating zone). The user model may be informed by data from the perception system (e.g., a camera image of the user's face), and exchanges information bi-directionally with the task-execution and training modules 110, 112. All these data structures—the prototype library, instance database, and user model(s)—are generally stored in memory (e.g., in mass storage permanently and in memory partitions during robot operation) and maintained by the system 100.

2. Robot Design

Figure 2A:
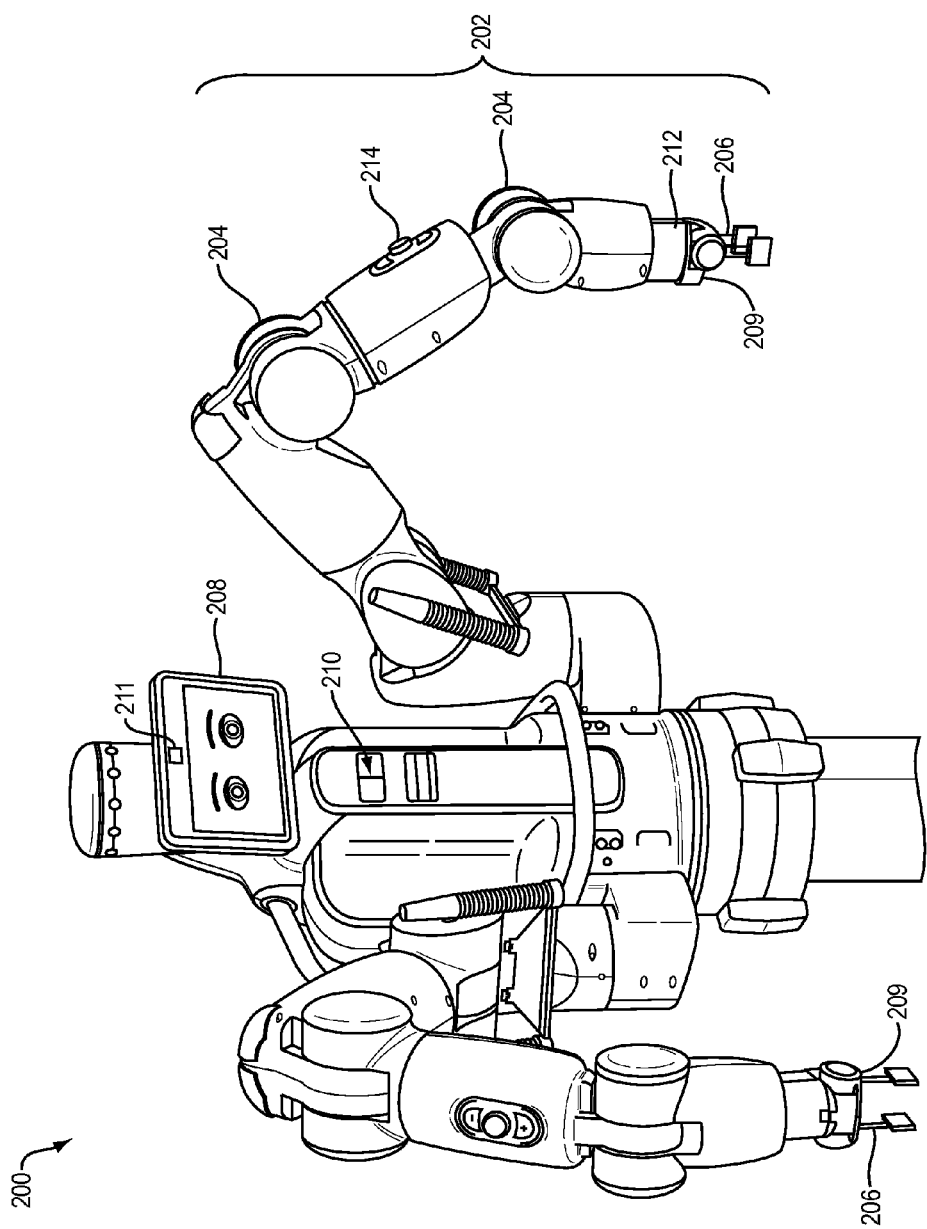
FIGS. 2A and 2B are perspective views of a robot in accordance with various embodiments.
Figure 2B:
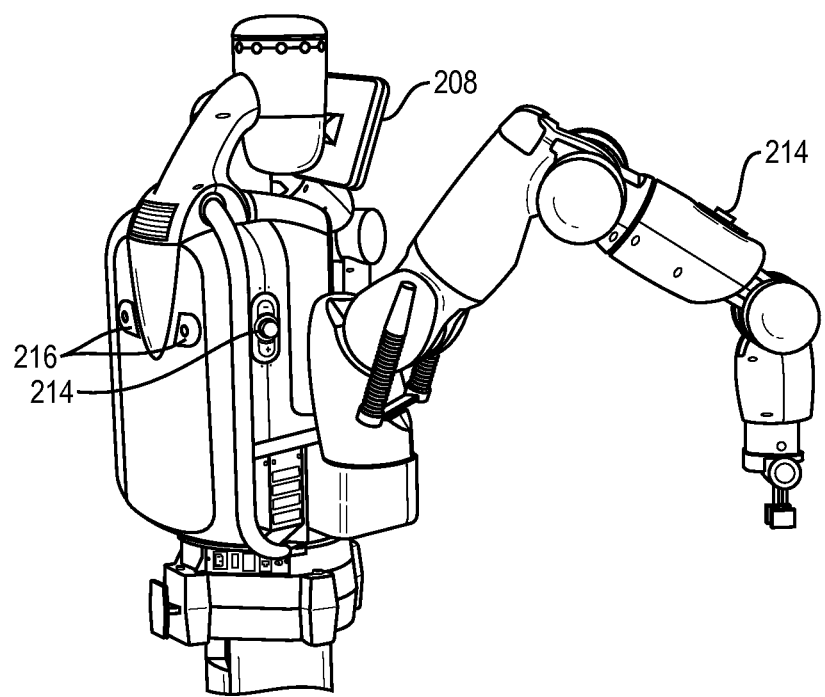

FIG. 2 shows a robot 200 in accordance with one embodiment. The robot 200 has two arms 202, each having seven degrees of freedom provided by suitable (and conventional) rotational joints 204. Each joint 204 desirably employs a series elastic actuator, enabling the robot to sense external forces applied to it, such as, e.g., forces resulting from unexpected collisions. Mounted at the end of each arm is a parallel-jaw gripper 206 that allows the robot to grasp, lift, and move objects. The robot 200 also has a head with a screen 208 and status lights, which serve to inform the user of the robot's state. The head and screen 208 can rotate about a vertical access, and nod about a horizontal axis running parallel to the screen 208.

Further, the robot 200 includes five cameras. It has one camera 209 in each of its two wrists so that the robot 200 can "see" objects it is about to pick up and adjust its grippers 206 accordingly. Further, it has two cameras 210, side by side, in its chest that provide a wide-angle view of the workspace and allow the robot 200 to visually detect equipment or objects to be manipulated. Finally, the robot 200 has a camera 211 above the screen 208 that is oriented outwards to detect people in the environment. The robot 200 may also include range sensors in each wrist, and a ring of sonar sensors in its head that are used to detect moving objects in the environment; see copending application Ser. No. 13/456,915, filed on Apr. 26, 2012 and hereby incorporated by reference.

In addition to these sensors for visually and/or acoustically detecting objects, the robot 200 may include a number of touch-sensitive sensors and mechanical features on its arms 202 and body that facilitate mechanical interaction with a person (e.g., a trainer). For example, on each wrist, the robot has a cuff 212 that, whenever touched, switches the robot arm into a "zero-force gravity-compensated" mode that allows the user to easily move the arm from place to place for training purposes In this mode, the robot controller 106 operates the robot arm so as to act like a set of links with low-friction bearings at each joint while compensating for gravity so that the arm does not drop to the lowest possible configuration (but instead acts as if it were in outer space). To accomplish gravity compensation, the controller 106 takes account of the instantaneous kinematic configuration of the robot, based on a detailed model of the robot's mass distribution, and applies torques to each joint to counteract gravity. The arm moves freely in response even to small forces, impeded merely by its inertia, as long as the wrist cuff 212 is held by the trainer. On the wrist cuffs 212 are two buttons 214 that can be used in the training process, for example, to map out areas by clicking one of the buttons at distinct points (e.g., the vertices of a polygon), to confirm correct visual selection of an object, or to manually cause the gripper to open or close.

Further, the robot 200 includes four identical sets 214 of knobs and buttons (each set collectively called a "navigator") on its arms, chest, and back. The navigators 214 allow the user to respond to information displayed on the screen 208 (e.g., by selecting menu items, switching between training and execution mode) and enter numbers (e.g., to indicate in how many rows and columns objects are to be packed in a box) or text (e.g., passwords or object and task names) via a digital rotary knob. The robot 200, moreover, includes two touch pads 216 on its shoulders, allowing a person coming up behind the robot 200 to tap the robot 200, thereby indicating on which side of the robot 200 she intends to stand when training the robot. These visual, sonar, and touch-based sensors are representative rather than limiting, and all are part of the robot's perception system 102.

The robot 200 described above is, of course, only one of many possible robot embodiments in accordance with the invention. Various components and features can be modified in manners that will be readily apparent to persons of skill in the art. For example, the robot may, generally, have any number of arms (or, more generally, appendages), and each arm may have any number of degrees of freedom. The links of the arms need not be joined by rotational joints with one degree of freedom (such as, e.g., hinge joints), but may, for example, include ball-and-socket joints that provide two rotational degrees of freedom, or rail systems that facilitate translational motion. Further, instead of grippers with fingers that close around an object, the robot may include suction grippers or other means of holding an object. Alternatively or additionally, the robot may have other types of end-effectors, e.g., tools (such as a drill, saw, etc.) or measuring devices (such as e.g., scales, gauges, etc.). The robot may also include legs, wheels, or similar means of moving its body as a whole. Furthermore, additional and/or different types of sensors may be installed in various locations of the robot's body and appendages. Likewise, the screen 208 and status lights may be placed in different locations, or replaced with or supplemented by different components for communicating information to the user. For example, the robot may include a speaker and/or microphone for audio-communication.

The control system 100 and its various components may be integrated into the robot, or kept (at least in part) in a separate control facility in communication with the robot. For example, in some embodiments, the task execution and training modules 110, 112 are implemented in software stored in memory of a general-purpose computer (e.g., in system memory—typically random-access memory (RAM)—during use, and/or on a hard drive, CD-ROM, or other non-volatile storage medium for long-term storage), and executed by the computer's processor. The user prototype library 116, instance database 114, and user model 118 may, likewise, be stored long-term in non-volatile memory, and loaded into system memory during use. The modules may be programmed in any suitable programming language, including, without limitation, high-level languages such as C, C++, C#, Ada, Basic, Cobra, Fortran, Java, Lisp, Perl, Python, Ruby, or Object Pascal, or low-level assembly languages. Communication between the robot and the computer may be established via, e.g., Bluetooth, WLAN, an 802.11 protocol, an Ethernet network, or any other wired or wireless connection. Alternatively, if the size of the robot allows, the computer or computer terminal may be built into the robot.

Further, instead of using a general-purpose computer, the control system may employ any of a variety of other processing devices, including, without limitation, special-purpose computers, microcontrollers, application-specific integrated circuits (ASICs), field-programmable gate arrays (FPGAs), digital signal processors (DSPs), or programmable gate arrays (PGAs). Such devices may, likewise, be mounted in or on the body, head, or appendages of the robot, or contained in a separate control facility that communicates with the robot via cables or wireless signals. In various embodiments, combinations of multiple different processing devices are used. Furthermore, in some embodiments, the overall control functionality is distributed between components physically integrated into the robot, and external components in communication with the robot. For example, the robot controller 106 and joint-level controllers 108, as well as hardware for acquiring camera images or other signals (and, possible, performing basic image/signal processing steps) may be located in the robot, whereas high-level data structures and processing functionality may be provided in a remotely located facility.

Figure 2C:
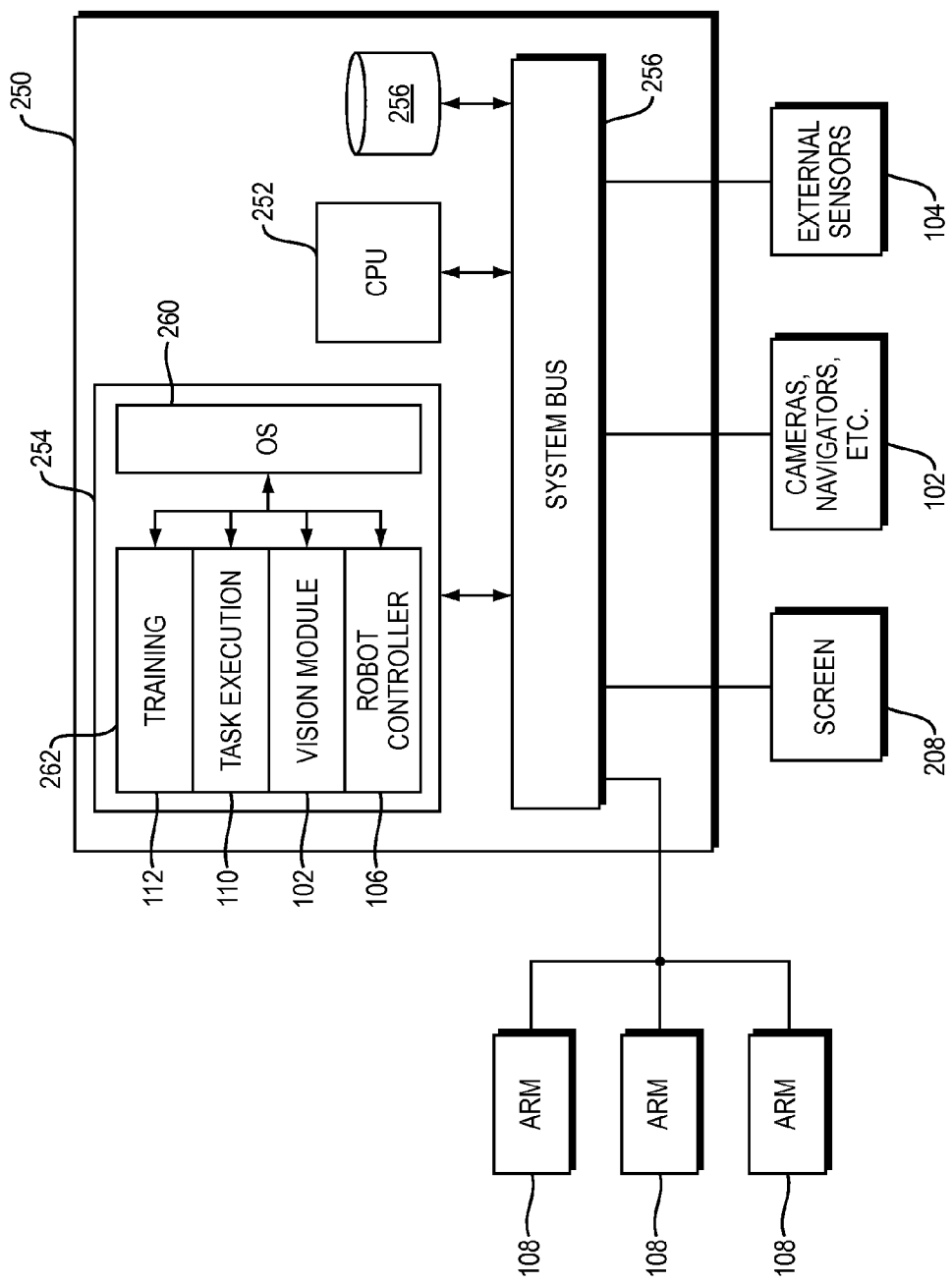
FIG. 2C is a block diagram illustrating an implementation of the computational and control functionality of a robot in accordance with various embodiments.

FIG. 2C illustrates an exemplary control system in block-diagram form. The system includes several ARM processors (reduced instruction set computer (RISC) processors developed by ARM Holdings, Cambridge, UK) that serve as the joint-level controllers 108. All other computational functionality, including the task-execution and training modules 110, 112 and the image-processing facility and related vision algorithms, are implemented on a general-purpose computer 250, embedded in the robot, which include a central processing unit (CPU) 252 (e.g., a quad-core Intel processor), system memory 254, and non-volatile mass storage devices (such as one or more hard disks and/or optical storage units). The computer 250 further includes a bidirectional system bus 256 over which the CPU 252, memory 254, and storage devices 256 communicate with each other and with internal or external input/output devices such as the screen 208, the hardware components of the perception system 102 (e.g., the cameras 209, 210, 211, navigators 214, wrist cuffs 212), external sensors 104, and/or traditional input devices (e.g., a keyboard or a mouse), as well as with the ARM processors 108.

The system memory 254 contains instructions, conceptually illustrated as a group of modules, that control the operation of CPU 252 and its interaction with the other hardware components. An operating system 260 (e.g., Gentoo Linux) directs the execution of low-level, basic system functions such as memory allocation, file management and operation of mass storage devices 256. At a higher level, one or more service applications 262 integrate robot controller 106, task-execution module 110, training module 112, and image-processing module. The prototype library 116, instance database 114, and user models 118 may be stored on the mass storage devices 256 and/or, during operation, in the system memory 254. In one embodiment, the robot controller 106 runs on the CPU 252 with a 100 Hz loop, whereas the vision algorithms and the training and execution modules run at a rate closer 10 Hz. The joint level controllers, if implemented as ARM processors, run, in one embodiment, at about 1000 Hz. Various alternative ways to implement control system 100 will be readily apparent to persons of skill in the art, and can, like the exemplary system depicted, be implemented without undue experimentation.

3. Task Representation and Operational Principles

Robot control systems in accordance with various embodiments represent tasks in memory in terms of primitive robot operations (i.e., robot movements or manipulations of objects), as well as types of places and classes of objects, fixtures, or equipment associated with these operations. More specifically, hard-coded prototypes of such primitive operations and related categories are stored in a prototype library 116, and serve as templates for the creation of instances of the prototypes that are used by the task execution module 110.

Figure 3:
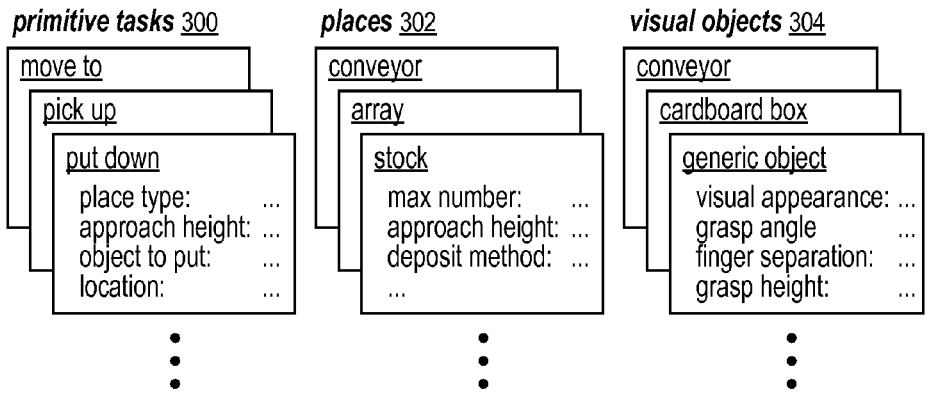
FIG. 3 graphically illustrates a prototype library in accordance with various embodiments.

FIG. 3 illustrates the structure of an exemplary prototype library 116 (or "template library") containing three classes of prototypes: prototypes for primitive operations or tasks 300, prototypes of places 302, and prototypes of visually recognizable objects 304. The primitive tasks 300 may include operations for, e.g., grasping, picking up, or putting down an object, inserting an object through a hole, or moving a robot appendage (that does or does not hold an object), to name just a few. Prototypes for places 302 may include, for example, a source or destination location of a particular type of object, a place where objects can be stacked, a rectangular array corresponding to the arrangement of parts in a carton or other carrier, or a conveyor belt. Prototypes for visually identifiable objects 304 may include classes of objects to be manipulated, and/or classes of specialized fixtures or equipment to be found in the environment (such as, e.g., conveyor belts, cardboard boxes, a weighing scale, a testing machine, etc.). Some classes of objects (e.g., cardboard boxes or conveyor belts) may have specialized visual routines associated with them, while others may belong to a generic object prototype. The robot instantiates an object prototype for each object it is visually trained to recognize.

While primitive tasks, places, and objects are useful prototype classes for many robot applications contemplated herein, they in no way limit the organization of prototypes into various categories. Other prototype categories that may be used in various contexts include, for example, complex-task prototypes (which may reference and specify the order of primitive tasks, or directly specify the motions making up the complex task), equipment prototypes (e.g., for containers, transportation vehicles, etc.), tool prototypes (e.g., for drills, saws, rasps, etc.), or time and sequence prototypes (e.g., for triggers associated with the beginning or end of certain tasks, a particular order of primitive tasks constituting a more complex task, etc.). In general, the prototypes within each class or category are characterized by similar types of information. As shown in FIG. 3, some entities may have associated prototypes in more than one category. For example, a conveyor belt may have both an object prototype and a place prototype associated with it, with the object prototype requiring specification of a particular visual technique for recognizing the conveyor belt, and the place prototype requiring specification of its function (e.g., as source or destination location of objects) and/or its location in spatial coordinates. Conceptualizing prototypes as belonging to one of a number of prototype categories may be helpful during the programming stage (i.e., when the prototype library is created), and may, but need not, be reflected in the structure of the prototype library 116. While some libraries have sub-libraries for the various categories of prototypes, other libraries store the prototypes indiscriminately in one general memory location.

Figure 4:
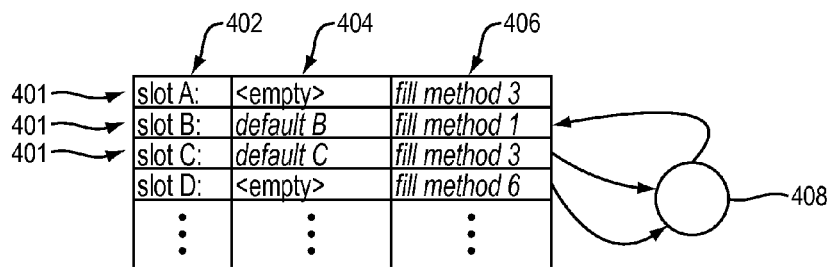
FIG. 4 depicts a data structure corresponding to a prototype in accordance with various embodiments.

FIG. 4 illustrates the general structure of a prototype 400. The prototype 400 provides a template data structure consisting of multiple slots 401, each including a slot label 402 and a slot filler 404 (or an empty field for receiving a slot filler). The prototype 400 further associates with each slot 401 a method 406, or set of methods, that may be used to fill the slot 401. The slot filling methods 406 are selected from a pool 408 of available procedures.

The process of training the robot involves selecting prototypes from the library 116, instantiating them (i.e., constructing data structures, called "instances," based on the templates), and filling in values in the instance slots. The manner in which slots are filled may vary with the category of prototype. As shown in FIG. 4, the prototype 400 may include default slot fillers 404 for some slots 401. Any such default fillers are copied over when the prototype is instantiated. Additional slots are filled through user input and/or appropriate inferences, using any of the filling methods 406 associated with the particular slot. In some embodiments, as the user fills slots, slot-filling procedures for opportunistically filling further slots based on the already-filled slots become available; in this way, the slot-filling procedures 406 provide active defaults and cross-object or cross-category slot data as more is learned from the user about a particular task. Usually, the user has the ability to manually change auto-filled values if they are not appropriate for the task. In general, as slot values are changed, the procedures associated with the prototype are re-invoked to propagate the information to any dependent fillers in others slots. Thus, a prototype is generally instantiated by a process of successive refinement.

Figure 5:
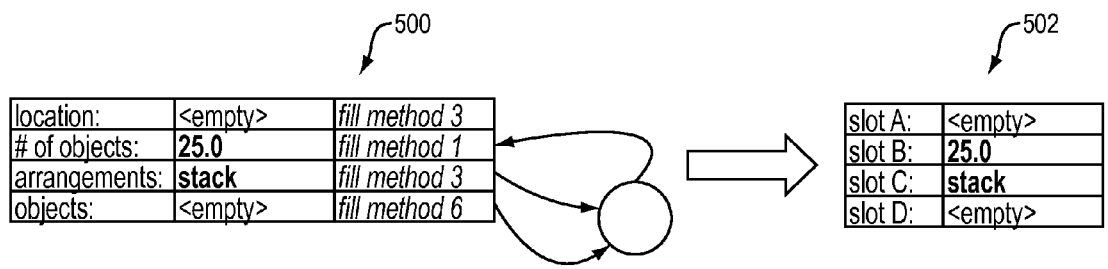
FIG. 5 illustrates the relationship between prototypes and instances in accordance with various embodiments.

FIG. 5 illustrates the relationship between a prototype 500 and a corresponding instance 502. The prototype 500, which directs the arrangement of objects in a stack, contains all the slots necessary for execution of the task (e.g., the location of the arrangement, the maximum number of objects in the arrangement, the type of the arrangement, and the type of objects to be arranged), and includes default fillers for some slots (e.g., an indication that the arrangement is a stack, and 25 as the maximum number of objects to be stacked). Further, the prototype 500 associates various filling procedures with the slots. In the instance 502 of prototype 500, the default fillers are adopted or modified based on known or observed information, and additional slots are filled in as the robot is trained or begins the task. Collectively, the values of the slot fillers determine the properties of the instance. Slot fillers may be actual data (e.g., the coordinates of the stack location), or references to instances of other prototypes. For example, the objects to be stacked may be boxes, which are further specified in a "box" instance. As another example, a prototype for a complex task may require specification of various subtasks, and slots for such subtasks may be filled with references to primitive-task instances. The object-oriented relationships among prototypes are readily specified and maintained in, e.g., a relational or object-oriented database.

Each time a prototype is instantiated during training, a unique instance is created. In general, a given task may involve multiple instances of the same prototype. For example, objects may need to be stacked in multiple locations, e.g., depending on their weight, and each of these locations corresponds to a separate instance 502 of the stack prototype 500. As soon as an instance is created from a prototype, the task execution module 110 is generally able to operate with it, even if some of the slots in the instance remain unfilled. If data for one of the unfilled slots is later needed during execution of a task involving the instance, the task execution module 110 may, for example, interrupt the execution and solicit input from the user to fill the slot. Some slots may never need to be filled (or default values overridden), depending on the task.

Figure 6:
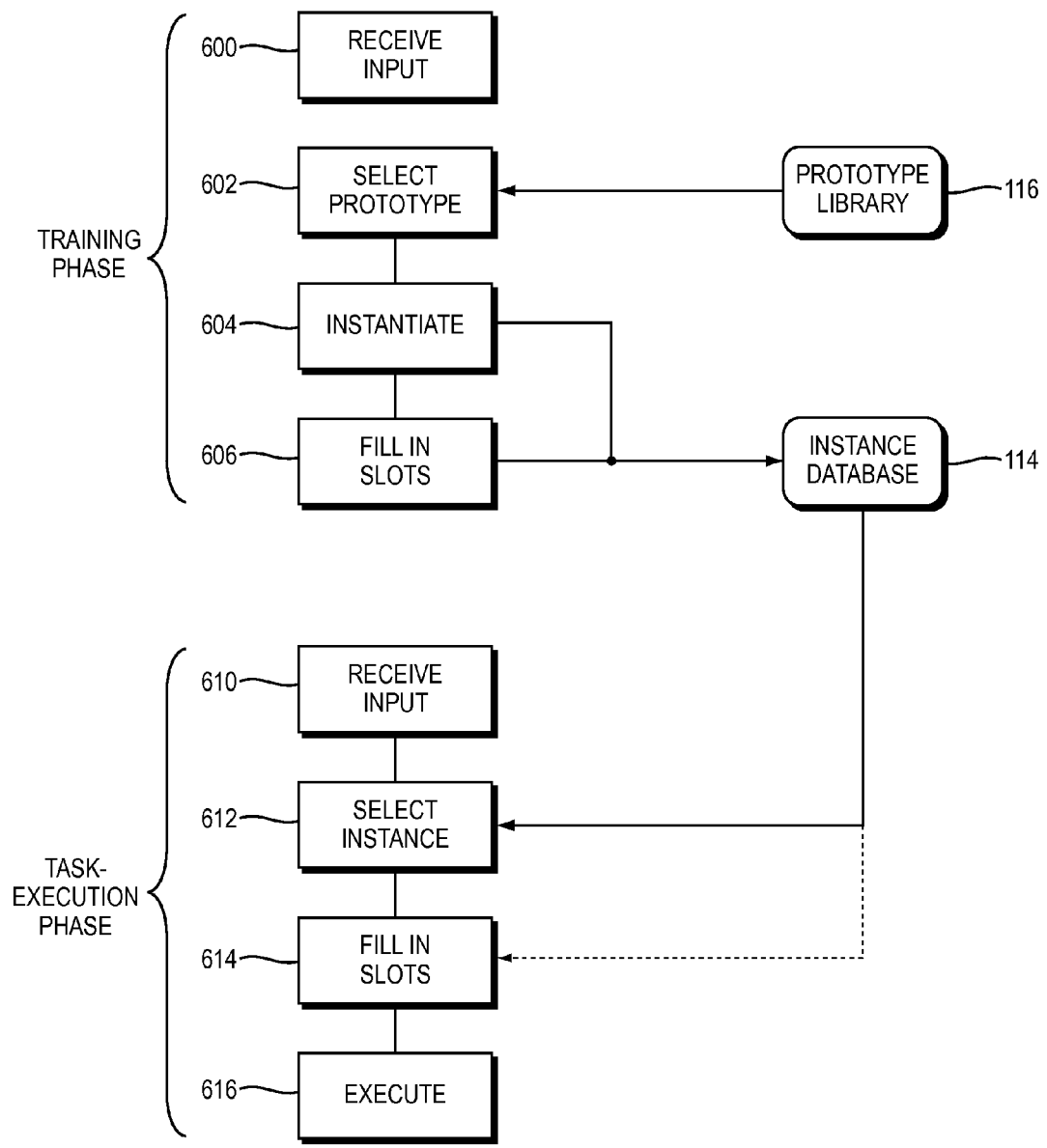
FIG. 6 is a flow chart illustrating training and task-execution methods in accordance with various embodiments.

FIG. 6 summarizes the use of prototypes and instances in accordance with various embodiments. In general, during the training phase, instance creation is triggered when the robot receives information via its perception system 102 and/or via direct user input (step 600). The robot uses the information to select a suitable prototype from the prototype library 116 (step 602) and, after or while instantiating the prototype (step 604), fill in one or more of the slots in the instance (step 606). For example, a robot trainer may turn the robot's camera towards an object, causing the robot to, first, create an instance of a generic "object" prototype based on the visual appearance of the object and, next, display a list of primitive tasks associated with the object prototype. Based on selection of one of the primitive tasks by the trainer, a prototype of that task is thereafter instantiated. The user may guide the robot's execution of the primitive task with respect to the object, thereby providing values to fill slots of the task instance. Instances thus created are stored in an instance database 114. The trainer can, at any time, terminate training, allowing the task-execution system to operate with the instances that have been specified. Later, the user can resume training, either in response to a request for more information from the robot, of her own accord.

Once sufficient instances have been created with sufficiently many slots filled, the robot may operate in task-execution mode and interpret these instances. In this mode, the robot generally waits to receive input from the user or from its perception system 102 (step 610) that triggers a particular task. Based on the input, the robot selects one or more instances (step 612) (e.g., an instance of an object it detects, an instance of a primitive task associated with the object, and an instance of a location where the task is to be performed), and, where appropriate, fills in open fields in the instance(s) (step 614). The task is then executed in accordance with the instance(s) (616). Primitive tasks (such as, e.g., "pick up" or "put down"), in particular, operate as rules with parameters, pre-conditions, and post-conditions specified by the respective primitive-task instances, as explained in more detail below. A (non-primitive) task is internally represented as a collection of rules that run opportunistically in execution mode. The trainer is generally not exposed to the representation or details of the rules, and does not even need to be aware of their existence.

Accordingly, rather than being taught a series of motions in terms of six-dimensional coordinates, the robot, in accordance with various embodiments, is taught a series of rules. In order to be able to translate these rules into actual motions during the execution phase, the robot maintains, at all times, a three-dimensional self-model of the locations and orientations of its body, head, arms, and any other actuated elements; typically this is implemented as a database relating elements and locations at a task-appropriate level of specificity (e.g., directional. Places that the robot needs to reach during performance of its tasks may be specified in coordinates relative to the robot, in terms of visually recognizable external objects and devices, or by reference to fiducial markers attached to things in the environment.

4. Perception, User Interaction, and Training

Various embodiments of the invention rely on the robot's ability to visually detect and/or identify objects and people in its environment. Such visual detection may, in itself, be a task that the robot needs to be trained to perform. Training generally involves the robot's continuous perception of the environment, coupled with input and feedback from a human trainer. For example, to teach the robot to visually recognize a particular object, the trainer may first orient one of the robot's cameras such that the object appears in the camera view, which may be displayed on the screen 208 in the robot's head. The trainer may point at the object in the camera view, e.g., using a mouse or touchscreen. Alternatively, the robot's computer vision system may attempt to identify the object of interest based on one or more rules; for example, the system may, by default, select the object in the center of the camera view or an object in the foreground of the image. Foreground and background may be distinguished based on depth information obtained, for instance, with a stereo camera or a separate depth sensor, or derived from two different but overlapping camera views. Trainer input may be used to confirm or reject the robot's automatic object selection. Once the object of interest has been indicated to the robot, the computer vision system may generate an outline of the object in the image, thereby identifying all the pixels it deems to belong to the object. This group of pixels may be identified based on, for example, brightness, color, or depth information; suitable algorithms are known to persons of skill in the art and include, among others, edge-detection algorithms. The user may, again, provide feedback to indicate whether the robot's computer vision system has correctly outlined the object, and cause corrections if necessary (e.g., by re-orienting the camera).

Next, the training module 112 creates an instance of the identified object. For some objects, the instance is an on-the-fly representation of the visual appearance of the object, created from a generic "object" prototype that requires specification of a vision model (including data structures and associated algorithms) that facilitates subsequent recognition of the same (or the same kind of) object. For example, the image of the object may be stored in the instance as a template for correlation-based matching with subsequently acquired images. Alternatively, a particular shape may be fitted to the object outline, and its parameter values stored with the instance for later comparisons, along with thresholds for the allowable deviation from the template parameters. Details of these and other vision models and techniques are known to persons of skill in the art of computer vision, and can be implemented in embodiments of the present invention without undue experimentation. In general, different vision models may be more or less suitable for different types of objects. Accordingly, the trainer may select a suitable model for the object the robot is being trained to recognize, or, alternatively, the robot may try different models and select the one that yields the best recognition performance, as determined, for example, based on user feedback. Regardless of the vision model used, the computer vision system of the trained robot does not distinguish between an individual object and a member of class of objects having the same appearance.

For some types of objects, the robot may have special prototypes stored in its prototype library 116 and utilize associated special visual-perception algorithms. For example, conveyor belts may be recognized based on the repeated and continuous motion of objects on the belt or of the belt itself, and cardboard boxes may be identified as such based on their flat surfaces, rectangloid shape, and cardboard coloration. Similar visual-detection algorithms may be used for a variety of other particular classes of objects. Which algorithms run at any given time to detect objects within their respective scopes may depend on the current task of the robot or on a characterization of its environment. For example, the robot may not need to visually search its environment for cardboard boxes unless its task involves placing objects into boxes or stacking the boxes.

In addition to detecting and identifying objects, the robot's perception system also serves to detect and/or identify people, including users who provide training and/or information required during task execution. In various embodiments, the robot continuously scans its environment for people, using, e.g., face detection and/or motion detection through sonar. Further, its control logic makes the assumption that when any of its buttons, touch panels, knobs, or wrist cuffs is activated, a person is responsible for such activation; the person's location may be estimated from the location of the activated control in the robot's self-model. During training, the robot may use this information to direct its screen 208 towards the person, and follow the person around as he moves in the robot's workspace. In execution mode, information about people's locations is used, for instance, to avoid collisions, i.e., to ensure safe operation. Further, beyond merely detecting the presence of a person, the computer vision system may identify particular users, e.g., based on face-template matching. This capability may be used for security, i.e., to ensure that only authorized users access the robot's control system and/or to tailor access privileges to the user. Further, it may be used to adjust user-robot interactions based on previous interactions with a particular user. For example, if multiple persons are involved in the robot's training over multiple sessions, the robot may, in a session with one particular user, suggest the next training objective based on the where that user left off in the previous training session.

In general, user-robot interaction involves bi-directional information flow. The user may, in various embodiments, provide input to the robot in a manner that mimics human interaction, such as mechanically (e.g., by physically moving the robot's arm, tapping the robot on the shoulder, or grabbing the robot's wrist) or visually (e.g., by standing in the field of view of one of the cameras and waving, pointing at an object, etc.). Additionally or alternatively, the user may control the robot by manipulating specialized robot controls on the robot's body and appendages (e.g., by pressing buttons, turning knobs, etc.), and/or enter information and instructions via traditional user input devices (such as mouse and keyboard). Further, in some embodiments, the robot includes a microphone and speech recognition software that allow it process voice commands. User input, however manifested to the robot, is recognized by the training module and used to guide the perception system 102 until the desired object is identified and analyzed—i.e., compared to existing prototypes and instantiated based on a matching or a generic prototype. User input is further employed, as described below, to specify object attributes.

Conversely, the robot may inform the user of its internal state and/or request input via its screen 208 and/or status lights. The screen 208 may display a traditional graphical user interface with text, windows, icons, etc., and—alternately or simultaneously—one or more camera views, optionally overlaid with robot-generated graphics (e.g., an object outline) that convey information in an intuitive manner. In some embodiments, the robot is also configured to convey information mechanically. For example, as the user moves the robot's arm, the robot may provide haptic feedback, warning the user, for example, of an impending collision with another part of the robot or an external object. Furthermore, to enhance user experience, the robot communicates its status, in some embodiments, by engaging in human-like behavior. For example, when the robot, during execution of a task, encounters unforeseen circumstances that require further input, the robot may move its head around and display a puzzled-looking face on its screen 208.

In the context of training the robot for a particular task, user input is generally used to create instances (of tasks, objects, places, etc.) and fill in slots in the instances. The training module 112 may fill some slots based on observations of user actions via the perception system 102, and some based on explicit user input. For example, to teach the robot to pick up an object, the trainer may select the prototype for the primitive operation "pick up" from a drop-down menu or list displayed on the screen 208, and then bring the robot arm above the object. The robot's vision system then detects the object and outlines it. If the user acknowledges correct selection of the object, e.g., by pressing a designated button on the wrist cuff, the training module 112 sets up a new instance of the generic object prototype, with a suitable representation of the appearance of the object. Further, the training module 112 uses the new object instance to fill the slot of the "pick-up" instance that indicates the object to be picked up. It also sets up an instance of a pick-up location, which, by default, is the location where the object was shown to the robot. The object instance just created fills the slot of the location instance that indicates what objects can be found at that location, and the location instance fills the slot in the "pick-up" instance that specifies where to pick up objects. The trainer then shows the robot how to grasp the object relative to its visual appearance. This process may involve manipulation and manual adjustment of the robot gripper and/or fingers by the trainer; for example, the trainer may orient the robot's fingers relative to the object and press buttons to open and close the fingers. Alternatively, the robot may make the adjustments itself, taking into account feedback provided by the user, e.g., via the traditional user interface. For example, the robot may display "virtual grippers" on a camera view of the object, and allow the user to drag the virtual grippers across the screen; the robot then adjusts its physical grippers based on the location of the virtual grippers relative to the camera view of the object.

In some embodiments, the trainer may be given a choice between different interactions available for certain steps in the training process. For example, to indicate a location where a task or subtask is to be performed (such as pick-up or destination location, or a test jig for measuring a property of the object), the user may either point to the location on the screen, or, alternatively, move the robot arm to the location. To move the arm, the user may grasp the robot by the cuff on one of its wrists, thereby switching the robot arm to zero-force gravity-compensated mode, in which the robot controller attempts to make the robot arm appear to have zero gravitational mass and move readily in response to the person dragging it by the cuff. In some embodiments, the user can also reconfigure the arm, should it have more than six degrees of freedom, by pushing on any of its links. As another example, to teach the robot how to arrange objects, e.g., in an array in a cardboard box, the user may physically guide the robot through the motions, or visually convey the desired arrangement, e.g., by dragging graphic representations of the objects into a virtual cardboard box on the screen. As will be appreciated from these examples, different types of interactions may be preferable (e.g., more convenient, more accurate, etc.) for different tasks. Regardless of the details of the robot-user interaction, the trainer works with the robot at the level of objects, ancillary equipment, and locations in the world, rather than specifying coordinates and trajectories of the robot appendages; in other words, training involves the application and creation of task-level rules that apply to varying environments and objects rather than particular spatial parameters having no applicability beyond a specific task instance. Further, the trainer need not teach subtasks in the sequential order in which they are normally to be carried out—rather, he shows the robot what actions to take in particular circumstances, resulting in the creation of prototype-associated rules.

User interactions similar to those employed during training may also take place during the robot's execution of tasks, e.g., when the robot halts the process to await further instructions, or when the user wants to modify the manner of execution in a particular case. The feedback provided by the user is translated by the training module 112 into adjustments to or modifications of task-associated rules. Further, the robot's perception system 102 generally operates in the same manner during the execution phase as it does during training, detecting objects, people, mechanical forces, etc. While the perception system 102 has been described herein with emphasis on visual and mechanical sensations (including touch and mechanical forces), it may also, for certain applications, provide perception capabilities for other types of physical input (such as temperature, electric and magnetic fields, etc.), and such input may be employed in the creation of instances and execution of tasks.

5. Robot Behaviors and Task Execution

Robot actions are generally controlled by the task-execution module 110, both during the performance of useful work and during training. Typically, the task-execution module 110 runs many behaviors in parallel. In this context, the term "behavior" is used in reference to "behavior-based robotic systems," and generally denotes a collection of processor-executable instructions relevant to a particular robot function (such as, e.g., monitoring the input of a sensor or processing an image), which may operate continuously, or only in certain circumstances when activated; in general, a behavior is more primitive than a task, and indeed, a task is carried out by the interaction of multiple behaviors, some running continuously, and some being triggered when their preconditions to operate become valid as the result of earlier behaviors. Multiple behaviors can interact by sending messages (e.g., data or instructions) to each other. Typically, each behavior is executed as an autonomous process in an object-oriented configuration and has local memory allocated to it.

In general, a behavior is adapted to accept specific inputs and, as a result of computations and internal-state changes, to provide specific outputs. Inputs may be provided, for example, through sensors (e.g., sensors of the perception system 102 or external sensors 104), data structures accessed by the behavior, or parameters passed over from other behaviors. Outputs include, for example, signals that select sensors for activation or deactivation, or requests for the robot controller 106 to execute particular primitive operations. For example, a behavior may process a primitive-task instance in conjunction with sensed locations of objects referenced by the instance to compute, on the fly, a trajectory that the robot can traverse to complete the task. Alternatively to computing a complete trajectory with start and end coordinates, the robot may determine a desired direction of motion and then move an appendage in that direction until a termination condition is met. For example, to perform the task of gripping an object, the robot may move its hand and gripper in the vertical direction until the gripper contacts the object or, in a situation where the palm of the robot hand should never touch the top of the object, until the hand is some fixed height above the surface on which the object to be grasped is sitting so that the fingers will come down on either side of the object as the hand is lowered. In some embodiments, the task-execution system dynamically computes and re-computes trajectories based on the current position, goal position, and incoming information from the vision system.

In certain embodiments, each behavior is organized for execution purposes into one or more "threads" that run in parallel in a threading module within the task-execution module 110. Herein, a "thread" is a piece of computer code that defines a finite-state machine (i.e., a finite number of states, along with conditions that trigger transitions between the states). Typically, the threads await input conditions that match an (often complex) set of conditions, and then initiate actions, either in controlling the robot or sending out a message. Sometimes, many thousands of threads run simultaneously in order to carry out a particular task the robot has been trained to perform.

In various embodiments, the robot behaviors each belong to one of two general categories of behaviors: built-in behaviors, which always run in the background independent of the task, and behavior instances that are coupled to instantiated primitive tasks and places. The built-in behaviors may, for example, provide safety for people as well as the robot, invoke the training module 112 when appropriate, and initiate diagnostics upon detection of anomalous conditions or for routine maintenance purposes. They are generic behaviors that operate in parallel with all specific tasks. Due to their existence, the user need not include error-handling procedures in the robot training. Conventional control systems for industrial robots, by contrast, usually require potential errors to be handled within the program code associated with a particular task.

In certain embodiments, the task-execution module 110 continuously runs a self-collision-prevention behavior, which prevents the arms (or, more generally, appendages) of the robot from colliding with each other or with other parts of the robot. This behavior uses the robot's self-model as input. When the user moves an arm around, holding on to its cuff in zero-force gravity-compensated mode, the self-collision-prevention behavior increases the robot-generated force on the arm from zero to counter any force applied by the user that might result in a collision with another part of the robot. The resistive robot-generated force increases as the user-guided arm, or portion thereof, gets closer to another part of the robot or another portion of the arm. The resistive force plays two roles. First, it makes it impossible, or nearly impossible, for the user to cause a collision, as the user, in order to do so, would have to apply forces exceeding those that the robot is capable of generating. Second, it gives the user haptic feedback, implicitly signaling that she is doing something wrong. The self-collision-prevention behavior is also active whenever the task-execution module 110 is trying to carry out a particular task (e.g., moving or manipulating an object), obviating the need for other behaviors that give commands to move an arm to worry about potentially causing a collision with, e.g., the second arm. The self-collision-prevention behavior ensures that the arms do not collide, waiting, if necessary, for the second arm to get out of the way before allowing the motion of the first arm to proceed, and, further, signaling the required waiting period to the requesting behavior, so that the latter can execute another task in the meantime if desired.

A second behavior that is, in certain embodiments, always active when the task-execution system 110 is running is the collision-detection behavior, which detects when an arm unexpectedly collides with an external object (or person). Unexpected collisions can occur, for example, with a person moving through the robot's workspace, or with an object that has been moved into the workspace. To facilitate collision detection, the joints of the robot arms include, in some embodiments, series elastic actuators capable of measuring forces on respective joints. Further, the task-execution module 110 may maintain forward-kinematic and -dynamic models of each arm, enabling the module 110 to predict, based on commands for robot motion, the profile of forces that ought to be measured on each joint. When the measured forces diverge significantly from these predictions, the collision-detection behavior infers a collision with an unexpected obstacle. It stops all motion immediately, waits for a short period of time, and then resumes the motion that resulted in the collision, more slowly than previously, to determine whether the obstacle has been removed. If unexpected collisions no longer occur, it allows the task-execution module 110 to continue carrying out its task. On the other hand, if the object does not disappear after a specified maximum number of waiting periods, the collision-detection behavior shuts down the task-execution module 110, and awaits user instructions to restart.

Further built-in behaviors coordinate the vision algorithms running in the perception system 102. They pass the visual descriptions of objects the robot has been trained to recognize to the computer-vision system, and activate the detection algorithms associated with the cameras on the robot's wrists when the end-effectors are not moving in order to see whether any of the objects are below the end-effectors. They may also activate vision algorithms on the chest cameras to monitor the environment for any changes that could be investigated with the wrist cameras. Other behaviors coordinate requests to the vision algorithms to look for specialized objects, such as cardboard boxes or conveyors, when the task at hand involves such objects. Since computer vision is computationally expensive, vision behaviors typically employ a priority scheme to allocate computation time to the various algorithms based on circumstances and present need, leaving enough computational capacity for all the other modules of the robot's control system. When objects are recognized, their locations in the world, relative to the robot, are typically broadcast to all the other behaviors (which, again, typically execute autonomously in an object-oriented fashion) in the task-execution module that need to know about them. Such automatic propagation of information via messages between behaviors is a key factor in enabling robots in accordance with various embodiments to adapt the details of task execution to changing positions of the robot itself and/or of objects related to the task. In some embodiments, the relevant objects are continuously tracked in the robot's coordinate system, allowing the instantiated primitive tasks to use current object locations to generate on-the-fly trajectories for the robot appendage(s).

In general, the robot control system may include many other built-in behaviors that are active at all times. For example, dedicated behaviors may be used to ensure that the robot is acting in a safe manner when the user model reports the nearby presence of a person, to maintain good working conditions for the robot, e.g., by controlling built-in lighting, and/or to calibrate and/or maintain the calibration of the robot. Different embodiments may utilize different built-in behaviors, depending on the requirements of their respective applications.

The second category of behaviors comprises instantiated behaviors corresponding to instantiated primitive tasks, places and/or other types of instances. Similarly, built-in behaviors that govern robot actions during the training phase may be included. Some behaviors are used both for training and during task execution; for example, a behavior for moving the end-effector so as to center an object in the view of a camera mounted therein can be used both to create an instance of the object during training and to recognize and/or grip the object later during task execution. Such dual-use behaviors may be programmed into both the training module 112 and the task-execution module 110, or provided for in one merged module. The behaviors themselves are instances of behavior prototypes or templates. The templates may be stored in the prototype library 116, and their instantiations in the instance database 114; however, since the training module 112 does not, in general, interact with the behaviors, it may be preferable to store the behavior templates and instantiated behaviors as part of the task execution module 110.

Figure 7:
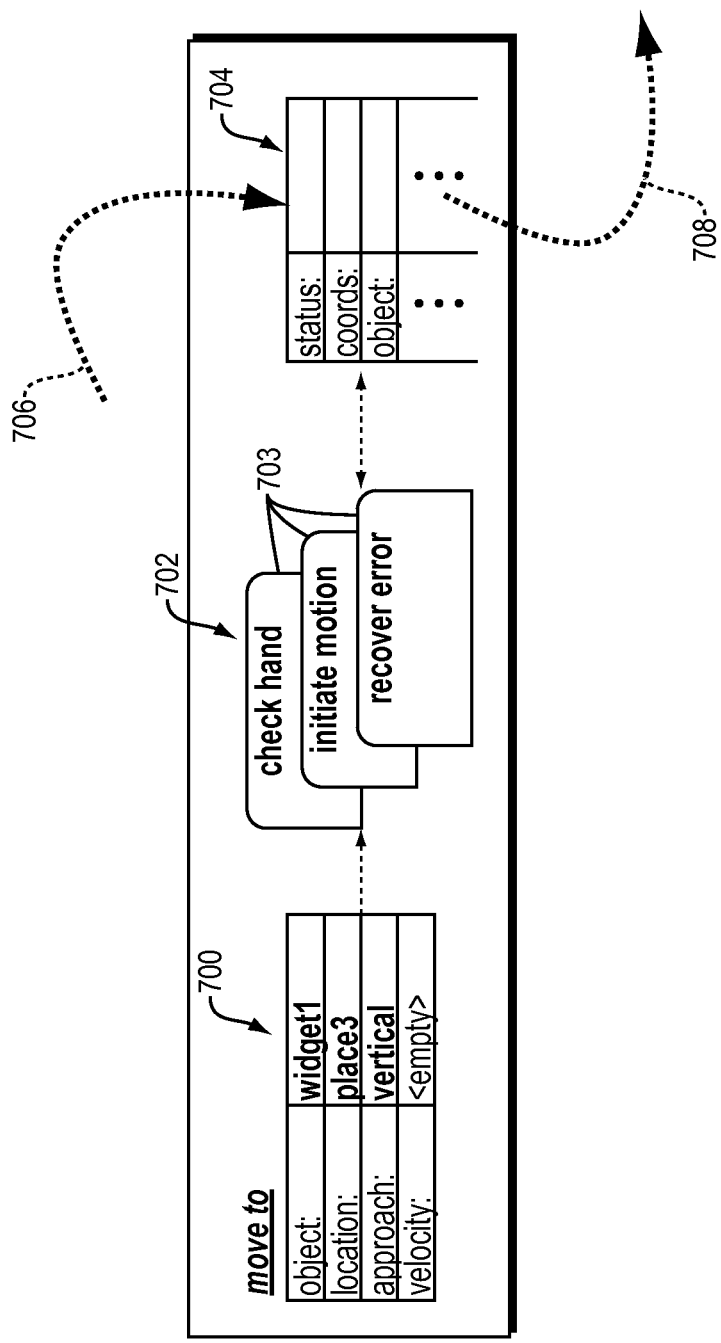
FIG. 7 graphically illustrates the relationship between instance of data structures and robot behaviors in accordance with various embodiments.

FIG. 7 illustrates the relationship between behaviors and the instances associated with them at the example of a primitive-task instance 700 for moving an object. The behavior 702 associated with the instance 700 (stored as records, with associated slots/attributes, in the instance database 114 shown in FIG. 1) includes multiple threads 703 that govern task execution and error handling; for example, one thread (conceptually executed by the task-execution module 110, though in reality by the system processor) may monitor the state of the robot's grippers to ensure that the gripper, in fact, holds an object, and another thread may initiate the motion upon a signal from the first thread. Each thread 703 has access to all the slots in the instance 700—this access is what associates the behavior 702 with the instance 700. The threads 703 further have access to a shared memory 704. Incoming messages 706, e.g., from other behaviors or from sensors, can be placed in the shared memory 704, and data stored in the shared memory 704 can be copied into outgoing messages 708.

The behaviors instantiated for places generally keep track of the objects that are present at the respective locations. For example, a behavior associated with an output stack may maintain a counter of the number of stacked objects by monitoring messages from the appropriate "put-down" behavior instance that references the stack as the place where objects are to be put down. Suppose that, during training, the system was told that the stack should never exceed a height of ten objects. Then, when there are nine or less items stacked, the instantiated stack behavior communicates to the instantiated put-down behavior that it is available to be acted upon (i.e., that another object may be stacked on top). Once the put-down behavior signals that it has successfully completed the operation, the stack behavior updates its count. When there are ten items on the stack, it tells the put-down behavior that it is full, thereby blocking further operation of the put-down behavior. However, the stack behavior accepts new inputs from the vision system, and if it receives a message that the number of objects has changed, it resets its count. In this way, the robot can automatically coordinate task-execution with a person. It stacks objects until the specified maximum number is achieved, and then stops stacking until the objects are removed by some entity other than a robot, such as a person, at which time the robot resumes stacking. Similar behaviors may be used, for example, to monitor the number of objects packed in a box, place objects in the box until the box is fully packed, and adjust actions when a human interferes, e.g., by placing an object into the box or removing an object from the box herself.

In scenarios where stacks can be created (or boxes packed) in multiple locations, the instantiated put-down behavior may access a list of those locations, allowing the robot, once one stack is full, to continue stacking objects in one of the other locations. Depending on which stacks are removed, the robot may adapt its actions and change the place where it is putting objects purely based on messages sent between behaviors. Further, if multiple different sorts of objects are available, say, on a conveyor belt, the robot may automatically tailor its behavior to opportunistically work on whatever objects are both available and have a non-full stack (or box). Thus, circumstances during task execution may dictate the precise order of operations. The person training the robot need neither specify the order of operations, nor make the rules that determine the order during execution explicit (although the trainer is free modify the behaviors that the robot executes). Rather, the instantiated primitive tasks and places, along with the behaviors associated with them, come to an intelligent response to the situation at hand by sending messages to each other.

For further illustration how various behaviors within the task-execution module 110 cooperate, consider the following interplay between instantiated behaviors for the primitive tasks of picking up and putting down objects. Suppose, the robot has been trained to recognize a particular type of object, say (for ease of reference), a widget. Suppose, further, that the trainer first showed the robot a particular place and taught it to put down the object at that place, and that he then showed the robot a conveyor belt, and taught it to pick up any widget it detects there. In various embodiments, this scenario results in instantiated pick-up and put-down behaviors, each having an associated instantiated data structure with a number of filled slots, and receiving messages from other behaviors as well as sensory systems. In other words, training interactions result in rule-level changes to specific robot behaviors through alteration of associated slot values.

The threads of the behaviors may be programmed as part of the task-execution module to make the behaviors act as rules with respective pre-conditions and post-conditions. For example, pre-conditions for the pick-up behavior include that the robot's hand or gripper is empty, that it is above the approximate location of the conveyor as of the time of training (the location being stored in a slot of the instantiated data structure), and that a widget is available on the conveyor (the widget itself being specified in a slot of the data structure). When all three pre-conditions are met, the pick-up behavior initiates a coupled object-tracking operation between the vision system (which is part of the perception system 102) and the robot controller 106. Once these two system components report that the object is being tracked (e.g., in a view provided by a camera in the robot's hand), the pick-up behavior causes the robot controller to move the robot hand downwards and close its fingers around the object. If the behavior receives, at any time, a message that tracking is lost, a clean-up thread of the behavior returns the hand to an appropriate height above the conveyor and waits for another object to come by.

Once the robot controller reports that something is grasped between the fingers (e.g., based on measurements of the distance between fingers or of a force exceeding a set threshold), the pick-up behavior sends a message that the hand holds a widget (since "widget" was the type of object specified in the pick-up instance). Receipt of this message by the put-down behavior satisfies two of the pre-conditions of that behavior: it now knows that the robot hand holds an object, and that the object is a widget. Thus, rather than being based on direct perception of the object in hand, satisfaction of the pre-conditions of the put-down behavior is inferred from the state of the (carefully written) pick-up behavior, which assumes that, if it has successfully operated under its pre-conditions, there is a widget in the robot's hand, and sends a message to that effect. To ensure that the pre-conditions for the put-down behavior remain satisfied, the robot controller continuously sends the status of finger separation to the put-down behavior; thus, if the robot accidentally drops the object, or if a person comes and takes the object out of the robot's hand, before the put down location is reached, one of the pre-conditions is no longer satisfied, and the put-down behavior, consequently, does not try to stack a non-existent widget at the destination location. On the other hand, if the pre-conditions are still satisfied when the destination (which is stored in the associated data-structure instance) is reached, the put-down behavior activates and causes the robot to put the widget down at the specified location. In this manner, the task execution module 110 can move widgets by first picking them up and then putting them down, even though it was taught these operations in a different order during training. More complex tasks, such as, e.g., tasks involving weighing and sorting objects, may include many more steps, which may, similarly, be taught in any order without affecting proper execution of the task at a later time.

Another example that illustrates the flexibility of task execution in various embodiments involves a robot that has been trained to pick up widgets from a conveyor belt with its left arm and place them within reach of its right arm, and to then pick up the widgets with the right arm and place them in a box. If, during performance of this task, a person places an object in the location where the right arm picks up widgets, the robot packs that object as well, as long as it can visually identify the object as a widget. In this way, the robot is able to opportunistically respond to its environment.

Accordingly, various embodiments of the present invention provide a high degree of flexibility in training and operating robots to perform tasks such as moving and manipulating objects. Once the robot has been taught all the individual components of or items relevant to the task (e.g., the primitive tasks corresponding to required robot motions, the object to be manipulated, etc.), the robot can operate autonomously. Its actions are triggered when it sees the objects it has been trained to manipulate. Since it uses computer vision to move the robot arm and hand to the exact location of the object, it is, generally, able to operate in a world where the positions of the robot and the objects vary. Further, since it only acts on objects that it recognizes, it is able to operate in a cluttered environment, where objects are constantly coming and going, by distinguishing objects irrelevant to its task from objects with which it has been trained to interact. The robot can also adjust its operation to parameters of objects in the environment. For example, when its task involves picking up objects from a conveyor belt, the robot tracks the objects on the moving belt visually, and grasps them accurately independently of the speed of the conveyor belt, its orientation, and even the direction in which it is operating.

Moreover, since the robot has been trained to respond to particular circumstances, it is need not slavishly follow a particular sequence of operations. It continuously senses the world around it via the external sensors 104, and adapts its actions accordingly based on an evaluation of the pre-conditions and post-conditions associated with the instantiated behaviors. For example, if a person intercedes and removes an object from the robot's gripper, the robot senses that change and does not continue to move as though an object were there. Instead, it returns to the part of the task that is conditioned upon an empty gripper, e.g., by moving to the location where it expects to find new objects to grasp. System and methods in accordance herewith do, of course, not necessarily preclude specifying a particular order of operations if it is desired to constrain the robot's execution of a task in this manner. In some embodiments, the user has the opportunity to specify the sequence of primitive tasks during training, either by adhering to the sequence when teaching the individual primitive tasks, or—if the primitive tasks are taught in an arbitrary order during training—by entering the order directly via the user interface (e.g., by adjusting a numbered list of the primitive tasks displayed on the screen). Alternatively, the order of steps that make up the complex task may be hard-coded into a prototype of the complex task.

The robot control system also has built-in error checks, as well as programmed methods for recovering from many possible detectable errors, eliminating the need for the trainer to show the robot how to handle error conditions. Unless the trainer includes specific error-handling procedures in the training (which she may want to do under certain circumstances), the robot uses its defaults, and is able to continue to operate safely and recover from errors.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. In particular, embodiments of the invention need not include all of the features or have all of the advantages described herein. Rather, they may possess any subset or combination of features and advantages. Accordingly, the described embodiments are to be considered in all respects as only illustrative and not restrictive.

What is claimed is:

1. A robot for manipulating objects within an environment based on physical perception thereof, comprising:
   at least one appendage for manipulating an object;
   a controller for operating the at least one appendage;
   a perception system for receiving physical information about at least one of the object or the environment from at least one sensor;
   an instance database comprising a plurality of stored instances at least some of which specify tasks to be performed by the appendage on the object; and
   a task-execution module, responsive to the perception system, for automatically selecting at least one of the instances from the instance database based on information received from the perception system, and automatically executing the at least one selected instance via commands to the controller.

2. The robot of claim 1, wherein at least one of the instances defines the task in generic, spatially unspecified terms.

3. The robot of claim 2, wherein at least one of the instances specifies the task in terms of motions of the appendage relative to at least one of the environment or the object.

4. The robot of claim 2, wherein the motions are defined in generic terms that do not specify spatial trajectories.

5. The robot of claim 1, wherein the instance database further comprises at least one of an instance defining an object class, an instance defining a type of equipment, or an instance defining a location.

6. The robot of claim 5, wherein the at least one task-defining instance references at least one of the instances defining the object class, the type of equipment, or the location.

7. The robot of claim 1, wherein the at least one instance references an object class, and wherein the task execution module is configured to cause the robot appendage, upon detection by the perception system of an object belonging to the object class, to perform the task on the detected object.

8. The robot of claim 1, wherein the perception system includes at least one camera.

9. The robot of claim 8, wherein the perception system includes a computer vision system.

10. The robot of claim 1, wherein the perception system includes at least one of a pressable button, a knob, a touch-sensitive pad, or a touch-sensitive cuff.

11. The robot of claim 1, wherein the task-execution module is configured to specify an attribute of the at least one selected instance based on the physical information.

* * * * *